(12) United States Patent
Ostroumova Prokhorenkova et al.

(10) Patent No.: US 9,934,319 B2
(45) Date of Patent: *Apr. 3, 2018

(54) METHOD OF AND SYSTEM FOR DETERMINING CREATION TIME OF A WEB RESOURCE

(71) Applicant: YANDEX EUROPE AG, Lucerne (CH)

(72) Inventors: Liudmila Alexandrovna Ostroumova Prokhorenkova, Yaroslavl (RU); Egor Aleksandrovich Samosvat, Moscow (RU); Petr Vladislavovich Prokhorenkov, Moscow (RU); Pavel Viktorovich Serdyukov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,673

(22) Filed: Dec. 28, 2015

(65) Prior Publication Data

US 2016/0110469 A1    Apr. 21, 2016

Related U.S. Application Data

(63) Continuation-in-part of application No. 14/703,314, filed on May 4, 2015.

(30) Foreign Application Priority Data

Jul. 4, 2014    (RU) .............................. 2014127288
Nov. 25, 2014    (WO) .................. PCT/IB2014/066333

(51) Int. Cl.
*G06F 17/00*    (2006.01)
*G06F 17/30*    (2006.01)

(52) U.S. Cl.
CPC .... *G06F 17/30887* (2013.01); *G06F 17/3089* (2013.01)

(58) Field of Classification Search
CPC ........... G06F 17/2235; G06F 17/30905; G06F 17/2247; G06F 17/3089; G06F 17/30067;
(Continued)

(56) References Cited

U.S. PATENT DOCUMENTS 6,735,694 B1    5/2004    Berstis et al.
7,191,400 B1 *    3/2007    Buvac ................. G06F 17/3089
                                                                          707/E17.013

(Continued)

FOREIGN PATENT DOCUMENTS

CN    103257989 A    8/2013
EP    2610767 A1    7/2013
(Continued)

OTHER PUBLICATIONS

International Search report from PCT/IB2014/066333; Mar. 18, 2015; Blaine R. Copenheaver.
(Continued)

*Primary Examiner* — Scott Baderman
*Assistant Examiner* — Hassan Mrabi
(74) *Attorney, Agent, or Firm* — BCF LLP

(57) ABSTRACT

A method and server for determining a creation time of a target page is disclosed. A page network of a plurality of pages including the target page and a plurality of links therebetween is created. Each page is a source or destination page for at least one link. Each page has a creation time and a creation time parameter. An initial value is assigned to the creation time parameter for each page. The creation time parameter of the target page is varied to maximize a page network probability which is based on a link probability for each link which is based at least in part on a difference
(Continued)

between the creation time parameters of the source and destination pages thereof. The creation time of the target page is determined to be the value of the creation time parameter thereof which maximizes the page network probability.

24 Claims, 4 Drawing Sheets

(58) Field of Classification Search
CPC ......... G06F 17/30595; G06F 17/80003; G06F 17/30864
USPC ................................ 715/513, 530, 500, 207
See application file for complete search history.

(56) References Cited

U.S. PATENT DOCUMENTS

| | | | |
|---|---|---|---|
| 7,499,965 | B1 | 3/2009 | Chai |
| 7,730,013 | B2 | 6/2010 | Dill et al. |
| 8,103,599 | B2 | 1/2012 | Gao et al. |
| 8,239,350 | B1 | 8/2012 | Vespe et al. |
| 8,521,749 | B2 | 8/2013 | Cutts et al. |
| 8,543,668 | B1* | 9/2013 | Long ................ G06F 17/30864 709/217 |
| 8,589,790 | B2 | 11/2013 | Seolas et al. |
| 9,426,046 | B2 | 8/2016 | Ivershen |
| 2001/0042064 | A1 | 11/2001 | Davis et al. |
| 2002/0052947 | A1* | 5/2002 | Duimovich ......... H04L 41/5016 709/224 |
| 2003/0014399 | A1* | 1/2003 | Hansen ............. G06F 17/30864 |
| 2005/0234877 | A1 | 10/2005 | Yu |
| 2006/0218134 | A1 | 9/2006 | Simske |
| 2006/0248456 | A1 | 11/2006 | Bender et al. |
| 2008/0040127 | A1 | 2/2008 | Williams et al. |
| 2008/0177994 | A1* | 7/2008 | Mayer ................... G06F 9/4418 713/2 |
| 2009/0204638 | A1 | 8/2009 | Hollier et al. |
| 2010/0076910 | A1 | 3/2010 | Gao et al. |
| 2011/0119220 | A1 | 5/2011 | Seolas et al. |
| 2014/0068411 | A1* | 3/2014 | Ross ....................... G06F 17/00 715/234 |
| 2014/0082482 | A1 | 3/2014 | Seolas et al. |

FOREIGN PATENT DOCUMENTS

| | | |
|---|---|---|
| JP | 2007328478 A | 12/2007 |
| WO | 0237229 A2 | 5/2002 |

OTHER PUBLICATIONS

English translation of JP 2007328478 retrieved from Espacenet on Jan. 13, 2017.
English translation of CN 103257989 retrieved from Espacenet on Jan. 13, 2017.
Nunes et al., Using Neighbors to Date Web Documents, Faculdade de Engenharia da Universidade do Porto, NESC-Porto, WIDM'07, Nov. 9, 2007, Lisboa, Portugal, Copyright 2007, ACM 978-1-59593-829-9/07/0011, 129-135.
Chen et al., Web Page Publication Time Detection and its Application for Page Rank, Journal of Computational Information Systems6:1, 2010, pp. 279-285, Available at http://www.JofCI.org.
Dong et al., Towards Recency Ranking in Web Search, WSDM'10, Feb. 4-6, 2010, New York City, New York, USA., Copyright 2010 ACM 978-1-60558-889-6/10/02, 10 pages.
Lu et al., Automatic Extraction of Publication Time from News Search Results, Webscalers, 10 pages.
Kanhabua et al, Using Temporal Language Models for Document Dating, Dept. of Computer Science, Norwegian University of Science and Technology, Trondheim, Norway, 4 pages.

* cited by examiner

METHOD OF AND SYSTEM FOR DETERMINING CREATION TIME OF A WEB RESOURCE

CROSS-REFERENCE

The present application is a continuation-in-part of US patent application bearing an application Ser. No. 14/703,314, filed May 4, 2015 and entitled "METHOD OF AND SYSTEM FOR DETERMINING CREATION TIME OF A WEB RESOURCE", which US patent application (a) claims priority to Russian Patent Application No. 2014127288, filed Jul. 4, 2014, entitled "METHOD OF AND SYSTEM FOR DETERMINING CREATION TIME OF A WEB RESOURCE" and (b) is a continuation of International Patent Application no. PCT/IB2014/066333, filed on Nov. 25, 2014, entitled "METHOD OF AND SYSTEM FOR DETERMINING CREATION TIME OF A WEB RESOURCE", the entirety of all of which is incorporated herein by reference.

FIELD OF THE TECHNOLOGY

The present technology relates to methods and systems for determining creation time of a web resource.

BACKGROUND

A vast quantity of information is available via the internet. The available information includes a variety of content types, such as photos, video, audio and the like, and relates to a wide range of topics, such as but not limited to news, weather, traffic, entertainment, finance and the like. Existing web pages are continually being updated to include new information, and new web pages including new information are continually being created and accessed via the internet.

The information can be accessed using a wide range of electronic devices such as desktop computers, laptop computers, smartphones, tablets and the like. A user may either navigate to a particular web site directly by using the address for that web resource that she is wishing to access. For example, when the user wishes to do her on-line banking with the Royal Bank of Canada, the user may know to access the web site www.rbc.com. In other circumstances, the user looking for information may not be aware of a particular web resource or a location thereof where the information can be found, and may instead perform a web search using a search engine, such as YANDEX, GOOGLE, YAHOO! or the like. As is known, the user enters a search query and the search engine provides a list of web resources that are responsive to the search query in what is known as a Search Engine Results Page or SERP, for short.

In order to enable fast, efficient retrieval of information via the internet, it is often important to know when a web resource is created. Creation time of web resources is often used in a variety of tasks related to information retrieval, such as web crawler scheduling, ranking of search results, sorting of search results and the like. Therefore, there is a need for a method and system for accurately determining the creation time for web resources.

SUMMARY

It is thus an object of the present technology to ameliorate at least some of the inconveniences present in the prior art.

According to one broad aspect of the present technology, there is provided a method of determining a creation time of a target page, the method being executable at a server coupled to a communication network. The method includes creating a page network comprising a plurality of pages including the target page and a plurality of links. Each link of the plurality of links has a source page and a destination page. Each of the source page and the destination page is one of the plurality of pages. Each page of the plurality of pages is one of a source page and a destination page for at least one of the plurality of links. Each page of the plurality of pages has a corresponding creation time. The creation time for each page is one of known and unknown. The creation time of the target page is unknown. Each page of the plurality of pages is associated with a corresponding creation time parameter T indicative of the corresponding creation time of the page. An initial value is assigned to the creation time parameter T for each page of the page network, the initial value assigned to the creation time parameter T for any page having a known creation time being the corresponding known creation time. The initial value of the creation time parameter T of the target page is varied to maximize a page network probability $P_{network}$. The page network probability $P_{network}$ is based on a link probability P for each link of the plurality of links. The link probability P for each link is based at least in part on a difference between a creation time parameter T of the source page of the link and a creation time parameter T of the destination page of the link, the difference being the age difference a between the source page and the destination page. The creation time of the target page is determined to be the value of the creation time parameter T of the target page which maximizes the page network probability $P_{network}$.

In some implementations, the target page is a plurality of target pages. Each target page of the plurality of target pages has a corresponding unknown creation time and a corresponding creation time parameter T associated therewith. Varying the initial value of the creation time parameter T of the target page to maximize the page network probability $P_{network}$ includes simultaneously varying the value of the creation time parameter T of all of the plurality of target pages to maximize the page network probability $P_{network}$. Determining the creation time of the target page includes determining the value of the corresponding creation time parameter T of each target page of the plurality of target pages when the page network probability $P_{network}$ is maximized as a function of all of the creation time parameters T of all of the target pages of the plurality of target pages.

In some implementations, the plurality of pages includes at least one page other than the target page, at least one page other than the target page being an anchor page. The creation time of the anchor page is known. The method further includes keeping the value of the creation time parameter T for the anchor page fixed while varying the value of the creation time parameter T of the target page to maximize the page network probability $P_{network}$.

In some implementations, for a first page of the plurality of pages, assigning the initial value to the creation time parameter T of the first page includes analyzing the first page. Responsive to analyzing the first page, a value for the creation time of the first page is extracted from one of a URL and a source code of the first page, the value extracted for the creation time of the first page being an extracted value of creation time. The initial value assigned to the creation time parameter T of the first page is the extracted value of creation time for the first page.

In some implementations, the extracted value of creation time of the first page is determined to be the creation time of the first page and the first page is determined not to be the target page based on a location from which the extracted value of creation time is extracted.

In some implementations, determining the extracted value of creation time of the first page to be the creation time of the first page and determining the first page not to be the target page is responsive to extracting the extracted value of the creation time from one of the following locations: the URL of the first page; a title of the first page in the source code of the first page; and a first portion of the source code of the first page other than the title, the first portion occurring before a portion of the source code related to the displayed content of the first page.

In some implementations, for the target page of the plurality of pages, the target page having at least one of an incoming link from a corresponding source page and an outgoing link to a corresponding destination page, assigning the initial value to the creation time parameter T of the target page includes determining a propagated value of creation time for the target page based on the creation time parameter of the corresponding at least one of the source page of the incoming link and the destination page of the outgoing link. The propagated value of creation time is assigned as the initial value for the creation time parameter of the target page.

In some implementations, the link probability for each link is further based on a quality parameter Q for the destination page for the link.

In some implementations, the quality parameter Q for a first page of the plurality of pages is predefined.

In some implementations, the quality parameter Q for a first page the plurality of pages is unknown. The method further includes assigning an initial value to the quality parameter Q for the first page, varying the initial value of the quality parameter Q of the first page to maximize the page network probability $P_{network}$, and determining the quality parameter Q of the first page to be the value of the quality parameter Q that maximizes the page network probability $P_{network}$.

In some implementations, the link probability for each link is further based on a decay parameter τ for the page network.

In some implementations, the decay parameter τ for the plurality of pages is determined to be a value that maximizes the page network probability $P_{network}$.

In some implementations, the link probability P for each link of the plurality of links is proportional to $$Qe^{-\frac{a}{\tau}} \text{ for } a \geq 0$$

Q being the quality parameter for the destination page of the link, a being the age difference between the between the source page and the destination page given by $T_{source}-T_{dest}$, $T_{source}$ being the creation time parameter T of the source page, $T_{dest}$ being the creation time parameter T of the destination page, $T_{source}$ being later than $T_{dest}$, τ being a decay parameter.

In some implementations, the link probability P for each link of the plurality of links is proportional to $$Qe^{-\frac{a}{\tau}}S(a)Q$$

being the quality parameter for the destination page of the link, a being the age difference between the between the source page and the destination page given by $T_{source}-T_{dest}$, $T_{source}$ being the creation time parameter T of the source page, $T_{dest}$ being the creation time parameter T of the destination page, $T_{source}$ being later than $T_{dest}$, τ being a decay parameter, and S(a) being a sigmoid function of a.

In some implementations, the sigmoid function is:

$$S(a) = 1 - \frac{1}{2}e^{-ca} \text{ for } a \geq 0; \text{ and}$$

$$S(a) = \frac{e^{ca}}{2} \text{ for } a < 0,$$

c being a sigmoid function parameter.

In some implementations, each number R is represented by two numbers X and Y, wherein:

$$R=Xe^Y$$

In some implementations, a gradient descent method is used to determine the value of the creation time parameter T that maximizes the page network probability $P_{network}$.

In some implementations, assigning the initial value to the creation time parameter T of each page includes for any page having a respective known creation time, assigning the respective known creation time as the initial value of the creation time parameter T of the corresponding page. Each page without a known creation time is analyzed to find a temporal expression therein. A value is extracted for the creation time of a page responsive to finding a temporal expression in the corresponding page, the value extracted for the creation time of the corresponding page being an extracted value of creation time. For any page having a respective extracted value of creation time, the respective extracted value of creation time is assigned as the initial value of the creation time parameter T of the corresponding page. The known creation times and the extracted values of creation time are propagated to obtain a propagated value of creation time for each page without any one of an extracted value of creation time and a known creation time and being linked, by a link chain including one or more links, to a page having any one of an extracted value of creation time and a known creation time. For any page having a respective propagated value of creation time, the respective propagated value of creation time is assigned as the initial value of the creation time parameter T of the corresponding page. For any page without any one of a known creation time, an extracted value of creation time, and a propagated value of creation time, assigning a predefined value as the initial value of the creation time parameter T of the corresponding page.

In some implementations, each page having a known creation time and each page having an extracted value of creation time is a dated page. Each page without any one of a known creation time and an extracted value of creation time is an undated page. For a first undated page with at least one dated page having a link to or from the first undated page, the propagated value of creation time for the first undated page is obtained by an average of the respective extracted values of creation time and known creation times of each of the at least one dated pages having a link to or from the first undated page.

In some implementations, each page having a known creation time and each page having an extracted value of creation time is a dated page. Each page without any one of a known creation time and an extracted value of creation time is an undated page. For a first undated page with at least one dated page having a link to or from the first undated page, the propagated value of creation time is obtained by a median of the respective extracted values of creation time and known creation time of each of the at least one dated pages having a link to or from the first page.

In some implementations, each page having a known creation time and each page having an extracted value of creation time is a dated page. Each page without any one of a known creation time and an extracted value of creation time is an undated page. For a first undated page with at least one dated page having a link to or from the first undated page, obtaining the propagated value of creation time includes: defining a quantile parameter q such that $0 \leq q \leq 1$, and selecting as the propagated value of creation time for the first undated page a value in the middle of a q-quantile of the respective extracted values of creation times of the at least one dated pages having a link from the first undated page and a (1−q) quantile of respective extracted values of creation times of each of the at least one dated pages having a link to the first undated page.

In some implementations, each page having a known creation time and each page having an extracted value of creation time is a dated page. Each page without any one of a known creation time and an extracted value of creation time is an undated page. Each undated page having a link to or from at least one dated page is a first undated page. For each first undated page, the corresponding propagated value of creation time is a first order propagated value obtained from the extracted values of creation time and known creation times of the at least one dated pages having a link thereto or therefrom. Each undated page not being a first undated page and having a link to or from at least one first undated page is a second undated page. For each second undated page, the corresponding propagated value of creation time is a second order propagated value obtained from the first order propagated values of the at least one first undated pages having a link thereto or therefrom.

According to another broad aspect of the present technology, there is provided a server communicatively coupled to a user electronic device and at least one host via a communication network. The at least one host hosts a plurality of pages. The server includes a processing module configured to create a page network comprising the plurality of pages including the target page and a plurality of links. Each link of the plurality of links has a source page and a destination page. Each of the source page and the destination page is one of the plurality of pages. Each page of the plurality of pages is one of a source page and a destination page for at least one of the plurality of links. Each page of the plurality of pages has a corresponding creation time. The creation time for each page is one of known and unknown. The creation time of the target page is unknown. Each page of the plurality of pages is associated with a corresponding creation time parameter T indicative of the corresponding creation time of the page. An initial value is assigned to the creation time parameter T for each page of the page network, the initial value assigned to the creation time parameter T for any page having a known creation time being the corresponding known creation time. The initial value of the creation time parameter T of the target page is varied to maximize a page network probability $P_{network}$. The page network probability $P_{network}$ is based on a link probability P for each link of the plurality of links. The link probability P for each link is based at least in part on a difference between a creation time parameter T of the source page of the link and a creation time parameter T of the destination page of the link, the difference being the age difference a between the source page and the destination page. The creation time of the target page is determined to be the value of the creation time parameter T of the target page which maximizes the page network probability $P_{network}$.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, a "web resource" is any data or collection of data that can be provided by a publisher over a network and that is associated with a web resource address. Non-limiting examples of web resources include web pages, text documents, image files, video files, audio files, and the like. Web resources may include content, such as words, phrases, pictures, video, audio and the like, and/or embedded information such as metadata, hyperlinks and/or embedded instructions (such as JavaScript scripts).

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
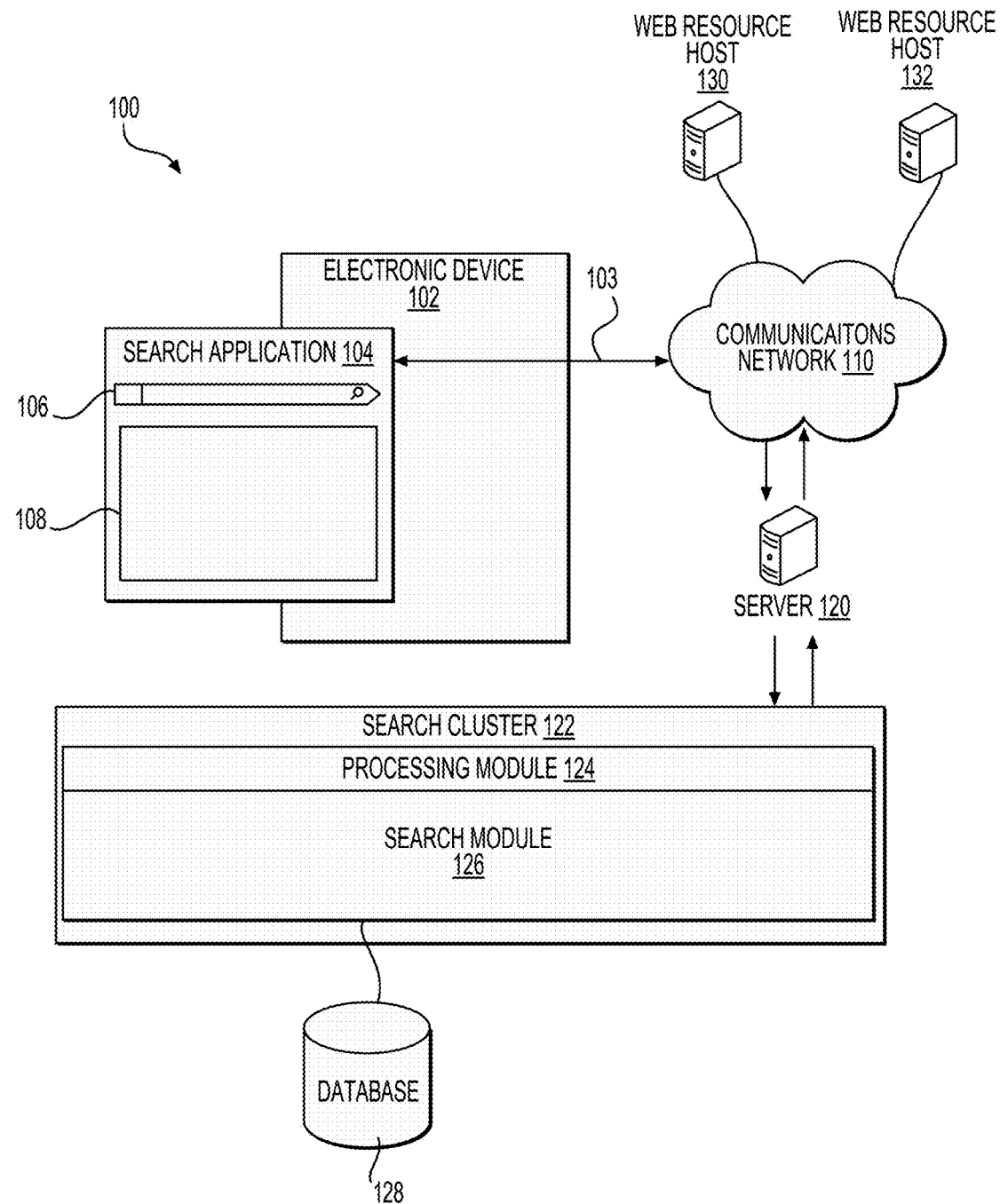
FIG. 1 is a schematic diagram of a network environment 100 implemented in accordance with an embodiment of the present technology.

With reference to FIG. 1, there is shown a schematic diagram of a network environment 100 suitable for implementing non-limiting embodiments of the present technology. It is to be expressly understood that the network environment 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes an electronic device 102, and a communication network 110. The electronic device 102 is coupled to the communication network 110 via a communication link 103. The electronic device 102 is typically associated with a user (not depicted) and, as such, can sometimes be referred to as a "user electronic device" or a "client device". In the illustrated embodiment, the electronic device 102 is a laptop computer. The implementation of the electronic device 102 is however not limited to a laptop computer 102. As an example, the electronic device 102 may be implemented as a smartphone, a personal computer (desktops, laptops, netbooks, etc.), a wireless electronic device (a cell phone, a smartphone, a tablet and the like), as well as network equipment (a router, a switch, or a gateway). The general implementation of the electronic device 102 is known in the art and, as such, will not be described here at much length.

Although the present description is made with reference to the network environment 100 having one electronic device 102, it should be understood that the network environment 100 could include more than one electronic device 102.

The electronic device 102 includes a user input interface (such as a keyboard, a mouse, a touch pad, a touch screen, microphone, and the like) for receiving user inputs. The electronic device 102 also includes a user output interface (such as a screen, a speaker, a printer and the like) for providing visual, auditory or tactile outputs to the user. The electronic device 102 includes a network communication interface (such as a modem, a network card and the like) for two-way communication over the communication network 110 via the communication link 103. The electronic device 102 also includes a processor coupled to the user input interface, the user output interface and the network communication interface. The processor is configured to execute various methods, including those described herein below. To that end the processor may store or have access to computer readable commands which, when executed, cause the processor to execute the various methods described herein. The electronic device 102 comprises hardware and/or software and/or firmware, as is known in the art, to execute various applications. Some of the applications are configured to receive and transmit information via the communication network 110. Examples of such applications include a browser application, a search application, a music streaming application, a photo sharing application, and the like.

In the illustrated embodiment of the present technology, the communication network 110 is implemented as the Internet. In other embodiments of the present technology, the communication network 110 can be implemented differently, such as a wide-area communications network, a local-area communications network, a private communications network and the like.

The communication link 103 can also have various non-limiting implementations, and the particular implementation(s) of the communication link 103 for the electronic device 102 will depend on how the electronic device 102 is implemented. In the illustrated embodiment of the present technology where the electronic device 102 is implemented, as a laptop, the communication link 103 for the first electronic device 102 can be either wireless (such as the Wireless Fidelity, or WiFi® for short, Bluetooth® or the like) or wired (such as a Universal Serial Bus or USB-based connection). Furthermore, the communication link 103 coupling the electronic device 102 to the communication network 110 could include more than one type of link. For example, in this exemplary embodiment, the laptop 102 could be coupled to the communication network 110 via wireless as a well as a wired connection.

It should be expressly understood that implementations for the electronic device 102, the communication link 103 and the communication network 110 are provided for illustration purposes only. As such, those skilled in the art will easily appreciate other specific implementational details for the electronic device 102 the communication link 103 and the communication network 110. As such, by no means, examples provided herein above are meant to limit the scope of the present technology.

The electronic device 102 comprises hardware and/or software and/or firmware (or a combination thereof), as is known in the art, to execute a search application 104. Generally speaking, the purpose of the search application 104 is to enable the user (not depicted) to execute a search using the above-mentioned search engine server 120.

The implementation of the search application 104 is not particularly limited. One example of the search application 104 may be embodied in a user accessing a web site associated with a search engine to access the search application 104. For example, the search application can be accessed by typing in an URL associated with a search engine at http://www.search.example. It should be expressly understood that the search application 104 can be accessed using any other commercially available or proprietary search engine. Thus is in this exemplary embodiment, the search application 104 is executed via a browser application.

Generally, speaking, the search application 104 comprises a query interface 106 and a search result interface 108. The general purpose of the query interface 106 is to enable the user (not depicted) to enter a search query or a "search string". The general purpose of the search result interface 108 is to provide search results that are responsive to the user query entered into the query interface 106. The processing of the search query and the presentation of the search results will be described in detail below.

Also coupled to the communication network 110 is a search engine server 120 for conducting searches responsive to search queries received at the search engine server 120. The search engine server 120 is connected to the electronic device 102 via the communication network 110. The search engine server 120 could also be connected to other servers, such as but not limited to network configuration servers, network resource servers, application servers, and other network configuration servers, via the communication network 110.

The search engine server 120 can be implemented as a conventional computer server. In an example of an embodiment of the present technology, the search engine server 120 can be implemented as a Dell™ PowerEdge™ Server running the Microsoft™ Windows Server™ operating system. The search engine server 120 could also be implemented as other kinds of network equipment such as, but not limited to, a router, a switch, or a gateway, a base station and the like. The search engine server 120 can be implemented in any suitable hardware and/or software and/or firmware, or a combination thereof. In the depicted non-limiting embodiment of present technology, the search engine server 120 is a single server. In alternative non-limiting embodiments of the present technology, the functionality of the search engine server 120 may be distributed and may be implemented via multiple servers.

The implementation of the search engine server 120 is well known. However, briefly speaking, the search engine server 120 comprises a network communication interface (not shown) structured and configured to communicate with the electronic device 102 and other devices coupled to the communication network 110. The search engine server 120 further comprises at least one computer processor (not shown) operationally connected with the communication interface and structured and configured to execute various methods to described herein. To that end the processor has a memory (in the form of Random Access Memory (RAM), flash memory, or the like), and/or is communicatively coupled to a memory that stores computer readable commands which, when executed, cause the processor to execute the various methods described herein. The search engine server 120 may additionally be coupled to (or otherwise have access to) one or more modules, such as but not limited to a web crawling module, a sorting module and a ranking module, as are known in the art.

The search engine server 120 can be configured to execute web searches. Functionality of the search engine server 120 is generally known, but briefly speaking, the search engine server 120 is configured to: (i) receive a search query from the electronic device 102; (ii) to process the search query (normalize the search query, etc); (iii) to execute a search for web resources that are responsive to the search query and (iv) to return a ranked list of search results to the electronic device 102 for the search application to output to the user the SERP containing links to web resources that are responsive to the search query.

The search engine server 120 is communicatively coupled (or otherwise has access) to a search cluster 122. The general purpose of the search cluster 122 is to perform searches in response to the user queries inputted via the query interface 106 and to output search results to be presented to the user using the search result interface 108. What follows is a description of one non-limiting embodiment of the implementation for the search cluster 122. However, it should be understood that there is a number of alternative non-limiting implementations of the search cluster 122 possible. It should be also understood that in order to simplify the description presented herein below, the configuration of the search cluster 122 has been greatly simplified. It is believed that those skilled in the art will be able to appreciate implementational details for the search cluster 122 and for components thereof that may have been omitted for the purposes of simplification of the description.

Generally speaking the purpose of the search cluster 122 is to (i) conduct searches; (ii) execute analysis of search results and perform ranking of search results; (iii) group results and compile the search engine result page (SERP) to be outputted to the electronic device 102. The configuration of the search cluster 122 for executing searches is not particularly limited. Those skilled in the art will appreciate several methods and techniques for executing the search using the search cluster 122 and as such, some of the structural components of the search cluster 122 will only be described at a high level.

In some non-limiting implementations of the present technology, the search cluster 122 comprises a processing module 124. The processing module 124 can execute several searches, including but not limited to, a general search, a vertical search, a meta search, a multi-level search, and the like. The specific details of the different kinds of searches will not be discussed herein as the description is not intended to be limited to any one kind of search. Any type of search, using any type(s) of methods and techniques as will be understood by a skilled worker may be used to conduct the searches described herein. To that end, the processing module 124 comprises (or has access to) a search module 126.

The search module 126 has access to a database 128 to conduct the web search(es). Although the database 128 is illustrated schematically herein as a single entity, it is contemplated that the database 128 can be implemented in a distributed manner, for example, the database 128 could have different components, each component being configured for a particular kind of search. It is also contemplated that the search module 126 could have access to a plurality of databases 128. Although the search module 126 is shown herein as being connected to a single database 128, the present technology is not intended to be limited to a single database 128.

The network environment 100 also includes a first web resource host 130 and a second web resource host 132. The first web resource host 130 hosts a plurality of web resources that can be accessed by connecting to the first web resource host 130 via the communication network 110. The second web resource host 132 hosts a plurality of web resources that can be accessed by connecting to the second web resource host 132 via the communication network 110. The first and second web resource hosts 130, 132 may also be connected to each other via the communication network 110, or even directly.

In the illustrated example, each of the web resource hosts 130, 132 is implemented as a separate server. Akin to the search engine server 120, each of the web resource hosts 130, 132 can be implemented as a conventional computer server. In an example of an embodiment of the present technology, each of the web resource hosts 130, 132 can be implemented as a Dell™ PowerEdge™ Server running the Microsoft™ Windows Server™ operating system. Each of the web resource hosts 130, 132 can also be implemented in any other suitable hardware and/or software and/or firmware or a combination thereof. In the depicted non-limiting embodiment of present technology, each web resource host 130, 132 is a single server. In alternative non-limiting embodiments of the present technology, the functionality of each web resource host 130, 132 may be distributed and may be implemented via multiple servers. It is also contemplated that the web resource hosts 130, 132 could be implemented by the same server.

It should also be understood that the web resource hosts 130, 132 and the web resources hosted by the web resource hosts 130, 132 as presented herein are exemplary. In the present description, the term "web resource host" is used interchangeably with the term "host" for convenience. The network environment 100 could include any number and kind of network resource servers and each network resource server could host any number and kind of network resources. For convenience of description, web resources are referred to hereinafter as web pages, or simply "pages". It should however be understood that the present technology is not to be limited to web pages, and can be implemented for any type of web resources.

Each of the web resource hosts 130, 132 hosts a plurality of web pages as mentioned above. Each web page is created at a given time referred to as the creation time for the page. The creation time for a web page is defined as the time at which the web page is uploaded on the web resource host, 130 or 132, for the first time and thereby becomes accessible for the first time, via the communication network 110, from an electronic device 102 located remotely from the web resource host 130 or 132. A web page could of course be updated subsequent to its creation to include additional information and then re-uploaded to the web resource host, 130 or 132. For the purposes of the methods 500, 600 described below however, the creation time of the web page is considered to be the original creation time, when the original version of the web page was first uploaded and made accessible via the communication network 110.

It should also be understood that the creation time could refer to the date (creation date) on which the web page was uploaded, with or without more precise information about the actual time of uploading of the web page on the creation date. Thus, the term "creation time" is used interchangeably herein with the term "creation date".

As mentioned above, it is often desirable to have accurate and precise information related to creation times of web pages. For example, creation time of web resources is used in a variety of tasks related to information retrieval, such as web crawler scheduling, ranking of search results, sorting of search results and the like.

Method for Determining the Creation Time of a Web Page

Figure 2:
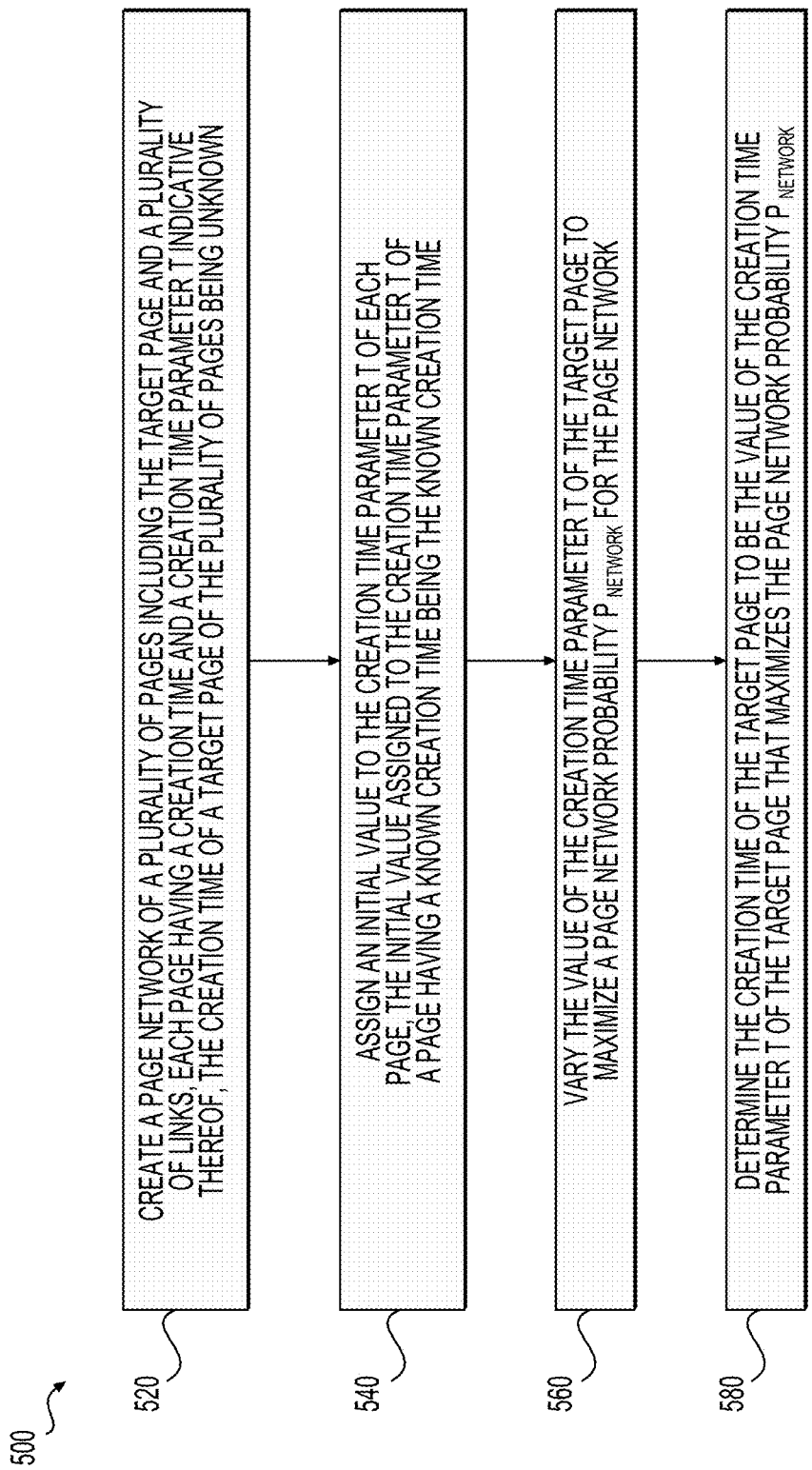
FIG. 2 is a flow chart illustrating a method for determining creation time of a web page in accordance with an embodiment of the present technology.

A method 500 for determining the creation time of a web page will now be described with reference to FIG. 2.

The method 500 is a link-based method for determining the creation time of a web page. It has been noted that a link probability for the occurrence of a link from a source page to a destination page is a function of the respective creation times of the source page and the destination page. In the method 500 described below, this dependence of the link probability on the creation times of web pages is used to determine the creation time (s) of a web page (s).

The method 500 is a link-based method used when the creation time of a page is either unknown, or the available information regarding the creation time of the web page is unreliable and/or approximate, for example, including only the month and/or year of creation, without the day and/or time of creation.

The method 500 is executed at a server, such as the search engine server 120, coupled to the communication network 110. The web page with the unknown, unreliable or approximately known creation time is referred to herein as a target page. Although the method 500 is described below with reference to a single target page, it should be understood that search engine server 120 may be aware of more than one target page. The method 500 could also be implemented to determine the creation times for a plurality of target web pages.

At step 520, a page network representation 300 of a page network 200 including a plurality of pages and a plurality of links therebetween is created. The page network representation 300 is a representation of an actual page network 200 including existing pages and actually existing links therebetween. For example, the page network 200 could include all of the pages crawled by a web crawler, or a subset thereof. Each web page has a creation time that may be known or unknown as will be discussed below in further detail, the method 500 being implemented to determine the unknown creation times.

Figure 3:
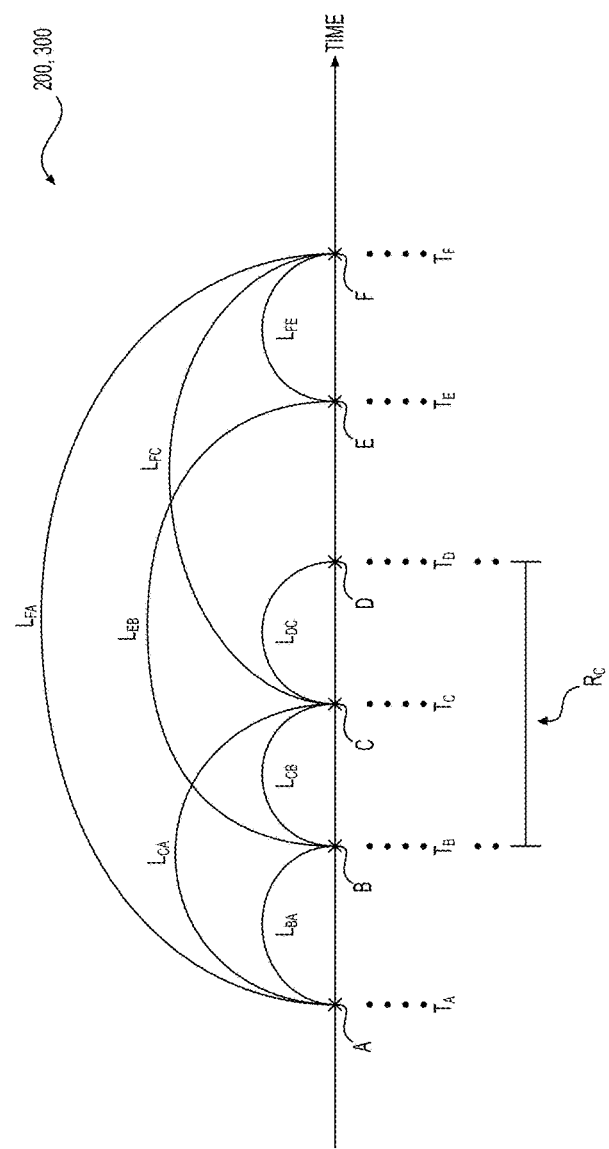
FIG. 3 is a schematic illustration of an exemplary page network in accordance with an embodiment of the present technology.
Figure 4:
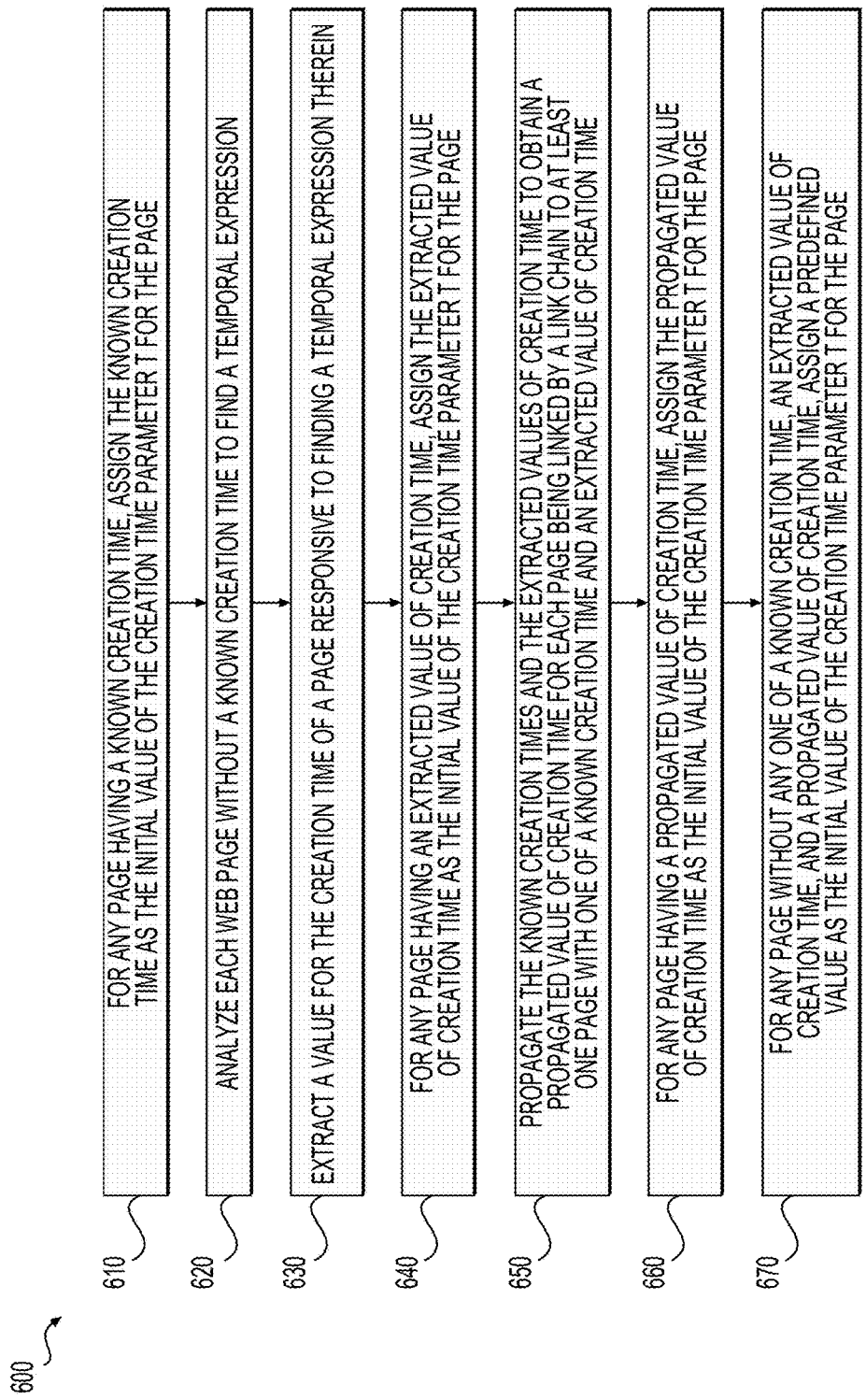
FIG. 4 is a method for assigning initial values for creation times in some implementations of the method for determining creation time shown in FIG. 2.

FIG. 3 shows an exemplary page network representation 300 of an exemplary page network 200. The exemplary page network representation 300 is in the form of a diagram with the web pages A, B, C, D, E and F, represented as nodes (indicated by crosses) and lines connecting nodes indicating links between the corresponding pages. In this exemplary page network representation 300, the nodes (web pages) A, B, C, D, E and F, of the page network 200 are arranged sequentially in order of their creation times, whether known exactly or estimated approximately. In this exemplary page network representation 300, the nodes (web pages) A, B, C, D, E and F, are spaced uniformly regardless of the actual differences between their creation times. It is however contemplated that the spacing between consecutive nodes (web pages) could be indicative of the time difference between their creation times. It should also be understood that the page network representation 300 is exemplary and for illustration only. The page network representation 300 of the page network 200 could be in other forms, such as but not limited to pictorial, vector, matrix, graphical, and the like.

With reference to FIG. 3, the method 500 will be described using an exemplary scenario of a page network 200 including six pages A, B, C, D, E and F. The exemplary page network 200 illustrated in FIG. 3 also has eight links $L_{CA}$, $L_{FA}$, $L_{CB}$, $L_{EB}$, $L_{DC}$, $L_{FA}$, $L_{FC}$, and $L_{FE}$, interconnecting the pages A, B, C, D, E and F. It should however be understood that the method 500 can be implemented in a page network 200 having a different number of pages than shown herein and having a different link structure than as shown herein. The page network 200, and the page network representation 300, shown herein is exemplary only and simplified for the purposes of illustration but the method 500 is by no means limited to the exemplary page network 200 shown herein.

In the described non-limiting implementation of the method 500, each of the pages A, B, C, D, E and F included in the page network 200 is linked to at least one other page A, B, C, D, E and F of the page network 200 by a link L. Thus, each page A, B, C, D, E and F included in the page network has at least one incoming or outgoing link. Each of the links L included in the page network 200 originates at one of the pages of the page network 200, and ends at another page A, B, C, D, E and F in the page network 200. In other words, for each link L included in the page network 200 created at step 520, both of the source page and the destination page are pages included in the page network. Thus, in this non-limiting implementation, any links from a page A, B, C, D, E and F of the page network 200 to a page not included in the page network 200 are omitted. Also omitted are self-referential links, i.e. links originating and ending at the same page, even if that page is included in the page network 200. In addition, the page network 200 created at step 520 includes all of the links between any one page A, B, C, D, E and F of the page network 200 and any other page A, B, C, D, E and F of the page network.

In a non-limiting implementation, all the pages A, B, C, D, E and F included in the page network 200 are hosted by the same host, such as a host 130, 132. It is however contemplated that the method 500 could be implemented using a page network 200 which includes pages from more than one host.

Each of the pages A, B, C, D, E and F is associated with a respective creation time parameter $T_A$, $T_B$, $T_C$, $T_D$, $T_E$ and $T_F$ that is indicative of the corresponding creation time for the page.

At step 540, an initial value is assigned to the creation time parameter T for each page in the page network 200. If the creation time of a page is known, the known creation time is assigned as the initial value of the creation time parameter T for the corresponding page. If the creation time of a page is unknown (i.e. the page is a target page), the initial value assigned to the creation time parameter T for the target page could be based on an estimation of the creation time. As will be discussed below, the creation time parameter T for pages associated with a known creation time is kept fixed in step 560 of the method 500, and the creation time parameter T for pages not associated with a known creation time are treated as variable in step 560 of the method 500.

It is contemplated that the creation time of one or more pages in the page network 200 could be known. For example, the knowledge of a creation time for a particular page could have been obtained during analysis of a different page network which also contained the particular page. For these pages having a known creation time, the creation time being known before the method 500 is commenced, the known creation time is assigned as the initial value of the corresponding creation time parameter T.

In some implementations, the initial value assigned to the creation time parameter of a page is based on creation time information obtained by a textual analysis of the page. Thus, in some implementations, at step 540, one or more pages of the page network 200 are analyzed to extract creation time information therefrom. As used herein, textual analysis of the web page includes analysis of the URL and the source code document (for example, the HTML document) for the web page. The creation time of the web page can be extracted by analyzing the URL (Universal Resource Location) of the web page to extract temporal expressions therefrom. For example, the URL of a page for a pancake recipe on the newsite, The Guardian™, is http://www.theguardian.com/lifeandstyle/2013/feb/10/nigel-slater-pancake-recipes" which includes the temporal expression "2013/feb/10". As another example, the creation time for the web page can be extracted by analyzing the HTML document of the web page. The creation time can also be extracted by analyzing the displayed content of the web page, such as the text, images, and the like, displayed therein. For example, the displayed content of the page may include a temporal expression in the form of a timestamp "Feb. 10, 2013" at the bottom of the displayed page indicating the creation time of the page. An extracted temporal expression is processed as appropriate to determine a possible value of creation time for the page. The value of creation time for a page thus obtained by extracting a temporal expression from the page (including the URL and source code thereof) and processing the extracted temporal expression is referred to herein as an extracted value of creation time. Various machine-learned algorithms, pattern analysis algorithms, HTML segmentators and the like may be used to extract temporal expression from different locations of the web page, and to obtain possible values of creation time from the extracted temporal expressions.

For any page associated with an extracted value of creation time obtained by textual analysis of the page as discussed above, at step 540, the extracted value of creation time is assigned as the initial value for the corresponding creation time parameter T of that page. In this exemplary scenario, textual analysis of the web pages A, B, D, E and F yields extracted values for creation times of the respective web page. The respective extracted values of creation time are assigned as the initial value for the corresponding creation time parameters $T_A$, $T_B$, $T_D$, $T_E$ and $T_F$.

In some implementations, the value of creation time extracted from a page by textual analysis thereof is considered to be the actual creation time, and the corresponding page is considered to have a known creation time. Thus, in these implementations, any page associated with an extracted value of creation time is not considered to be a target page.

In some implementations, the reliability of an extracted value of creation time as an indicator of the actual creation time is also considered. A page is considered to have a known creation time if the extracted value of the creation time extracted by analysis of the page is considered to be reliable. If the extracted value is not considered to be reliable, the web page is considered to be a target web page having an unknown creation time for the purposes of the method 500. The reliability of an extracted value of creation time is based on one or more factors such as the location from which the temporal expression is extracted, consistency with other values extracted from the page, and the like. The reliability of an extracted value of creation time will be discussed in more detail below with reference to the method 600.

In the exemplary scenario, the extracted values of creation times obtained from each of the web pages A, B, D, E and F are considered to be reliable, i.e. the extracted value of creation time for each of the pages A, B, D, E and F is deemed to be the actual creation time of the respective page. Thus, the pages A, B, D, E and F are considered to have known creation times. The respective initial values assigned to each of the creation time parameters $T_A$, $T_B$, $T_D$, $T_E$ and $T_F$ are kept fixed (not variable) in step 560 as will be discussed below. It is contemplated however that the extracted value of creation time for one or more of the pages A, B, D, E and F could be determined not to be reliable, and the corresponding page could be considered to be a target page with the corresponding creation time parameter T being variable for the analysis in step 560 as will be described below. It is further contemplated that the extracted value of creation time for a page includes only approximate or coarse-grained information (for example, only a year), and the corresponding page could be considered to be a target page with the corresponding creation time parameter T being variable for the analysis in step 560 as will be described below.

In the illustrated implementation, at step 540, for any page associated with an extracted value of creation time, the extracted value is assigned as the initial value of the corresponding creation time parameter T for the corresponding page, whether or not the extracted value is considered to be reliable. In the illustrated implementation, the extracted value of creation time that is considered not to be reliable is used as an initial estimation of creation time, and this initial estimation of creation time is further refined in step 560 by varying the initial value of the corresponding creation time parameter T as will be described below. It is however contemplated that, at step 540, an extracted value of creation time that is not considered to be reliable could not be assigned as the initial value of the creation time parameter T for the corresponding page (target page).

In some implementations, at step 540, the initial value assigned to the creation time parameter for the target page is obtained by propagating the extracted values of creation times and/or otherwise known creation times of web pages of the page network 200 having links to/from the target page with the unknown creation time. A value of creation time estimated by propagation is referred to herein as a propagated value of creation time.

In this exemplary scenario, an analysis of the web page C does not find any temporal expressions therein and the creation time of the page C is not known otherwise. Therefore the page C is a target page. In this exemplary scenario of FIG. 3, the target page C has two outgoing links, $L_{CA}$ and $L_{CB}$, to pages A and B respectively, and two incoming links, $L_{DC}$ and $L_{FC}$, from pages D and F respectively. A link for which the target page C is a source (outgoing link from page C) or a link for which the target page C is a destination (incoming link to target page C) is referred to hereinafter as a target page link for convenience. In the exemplary scenario of FIG. 3, the links $L_{CA}$, $L_{CB}$, $L_{FC}$, and $L_{DC}$, are the target page links. In this exemplary scenario, looking at the outgoing target page links $L_{CA}$ and $L_{CB}$, with the page B having a later creation time than the page C, the creation time of the target page C can be estimated to be no earlier than the creation time of the page B. Similarly, looking at the incoming target page links $L_{DC}$ and $L_{FC}$, where the page D having the earliest creation date of the destination pages, the creation time of the target page C can be estimated to be no later than the creation time of the page D. Based on the above analysis, the creation time of the page C can be estimated to be in a range $R_C$ between the creation times of the pages B and D. In this exemplary implementation, a time in the middle of the range $R_C$ is defined to be the propagated value for the creation time for the page C, and accordingly assigned as the initial value for the creation time parameter Tc at step 540.

In general, the propagated value of creation time is a function of the creation times of the web pages linked to the target page C. Propagated values of creation time values will be discussed below on further detail with reference to the method 600.

As mentioned above, although the method 500 is being described herein, for convenience, with the assumption that the page network 200 has only one target page C with an unknown creation time $T_C$, the method 500 is not limited to this assumption. The page network 200 can have more than one target page with an unknown creation time.

It is also contemplated that for some pages of the page network 200, the creation time cannot be extracted by analysis of the web page, and the creation time cannot be obtained by propagation of the extracted and/or known values for creation times of other linked web pages. For example, a particular subset of interlinked web pages in the page network 200 may not be linked to any other web page having a known and/or extracted value for the creation time.

In some implementations, for a target page not associated with an extracted or propagated value of creation time, the creation time parameter T could be assigned an initial value based on other factors such as the first update time, or the time of the first visit to the webpage by a user accessing the web page via the communication network 110, and the like. In some implementations, for a target page not associated with an extracted or propagated value of creation time, the creation time parameter T could be assigned an initial value that is predefined for the page network 200. Thus, at the end of step 540, an initial value has been assigned to the creation time parameter T associated with each page in the page network 200. For pages associated with a known creation time (known by textual analysis or otherwise), the initial value assigned is the known creation time. For target pages, the initial value assigned to the creation time parameter T is an estimated creation time obtained by textual analysis of the page, propagation of other known/extracted values of creation time, or defined based on other factors. After an initial value has been assigned at step 540 to the creation time parameter T for each page in the page network 200, at step 560, the initial values of the creation time parameter T of the target pages are refined to determine the actual creation time for each target page. Pages with known creation times are referred to herein as anchor pages, and the corresponding creation time parameters T of the anchor pages are fixed at step 560.

At step 560, the initial values of the creation time parameter T of the target web page is varied to maximize a page network probability $P_{network}$ for the occurrence of the page network 200.

As mentioned above, the page network 200 has a plurality of pages and a plurality of links therebetween. The link probability P for the occurrence of a link from a source page in the page network 200 to a destination page in the page network 200 is based on the respective creation times, i.e. the respective creation time parameters T, of the source page and the destination page for the link.

The page network probability $P_{network}$ for the occurrence of the entirety of the page network 200 with the plurality of links thereof depends on the respective individual link probabilities for each of the links in the page network 200. For the exemplary page network 200 illustrated in FIG. 3 having the eight links $L_{CA}$, $L_{FA}$, $L_{CB}$, $L_{EB}$, $L_{DC}$, $L_{FA}$, $L_{FC}$, and $L_{FE}$, the page network probability $P_{network}$ is P a product of the respective eight individual link probabilities $P_{CA}$, $P_{FA}$, $P_{CB}$, $P_{EB}$, $P_{DC}$, $P_{FA}$, $P_{FC}$, and $P_{FE}$. The page network probability $P_{network}$ is thus a function of the creation time parameters T of all of the pages in the page network 200.

$$P_{network} = f(T_A, T_B, T_c, \ldots)$$

This dependence of $P_{network}$ on all the creation times is used to determine the unknown creation times of target web pages in the page network 200.

In some implementations of the method 500, the link probability P of having a link from a source page to a destination page is assumed to depend on the age difference $a = T_{source} - T_{dest}$ between the source page and the destination page, with $T_{source}$ being the creation time parameter of the source page, $T_{dest}$ is the creation time parameter of the destination page, and with $T_{source}$ being later than $T_{dest}$. For example, assuming that page C was created later than page B, the probability $P_{CB}$ of having a link from page C to page B depends on the age difference $a_{CB}$ between their respective creation times, where $a_{CB} = (T_B - T_C)$.

In the illustrated implementation, the link probability P of the occurrence of a link from a source page to a destination page is inversely exponentially proportional to the age difference a:

$$P \propto Qe^{-\frac{a}{\tau}} \text{ for } a > 0$$

Thus, for example, the probability $P_{CB}$ of the link from page C to page B is proportional to $e^{-(TB-TC)/\tau}$. In other words, the probability $P_{CB}$ of the link from page C to page B decreases exponentially with their age difference ($T_B - T_C$). The constant $\tau$ is a decay parameter and Q is a quality parameter associated with the destination page as discussed below in further detail.

In some implementations, links are assumed to originate from a source page created at later time than the destination page of the link. Thus, in these implementations, the link probability P is assumed to be 0 for a negative age difference, i.e. for $a \leq 0$.

In some implementations, the link probability between a source page and a destination page is proportional to $$P \propto Qe^{-\frac{a}{\tau}} S(a) \text{ for all } a$$

where S is a sigmoid function. Assuming a dependence of the link probability P on the sigmoid function S(a) allows the link probability to be differentiable, and thereby reduces the number of operations performed to maximize the page network probability $P_{network}$.

In some implementations, the sigmoid function S is:

$$S(a) = 1 - \frac{1}{2}e^{-ca} \text{ for } a \geq 0; \text{ and}$$

$$S(a) = \frac{e^{ca}}{2} \text{ for } a < 0,$$

where c is a sigmoid function parameter. In some implementations, the value of the sigmoid function parameter c is known and predefined. In some implementations, the value of the sigmoid function parameter is determined as will be discussed below.

Thus, in some implementations, the link probability between a source page and a destination page is proportional to $$P \propto Qe^{-\frac{a}{\tau}}\left(1 - \frac{1}{2}e^{-ca}\right) \text{ for } a \geq 0; \text{ and}$$

$$P \propto Qe^{-\frac{a}{\tau}}\frac{e^{ca}}{2} \text{ for } a < 0$$

It should be understood that the sigmoid function S(a) or the link probability P is not to be limited to those described herein.

At step 560, the value of the creation time parameter T of the target page is varied to determine the value of the creation time parameter T that maximizes the page network probability $P_{network}$ for the occurrence of the page network 200.

At step 580, the unknown creation time of the target web page in the page network 200 is determined by determining the value of the creation time parameter T for the target page that maximizes the page network probability $P_{network}$ for the occurrence of the page network 200.

In some implementations, at step 560 a plurality of different hypothetical values of creation time are assigned to the creation time parameter T, and the page network probability $P_{network}$ is determined for each one of the assigned hypothetical values, to determine which one of the hypothetical values of creation times provides the greatest value for the overall probability $P_{network}$ for the page network 200. For example, in the exemplary page network 200 of FIG. 3, the creation time parameter $T_C$ of the target page C is initially assigned a value $T_{C0}$, for which the page network probability $P_{network}$ is computed. The creation time parameter $T_C$ is then successively assigned a plurality of hypothetical values $T_{C1}$, $T_{C2}$, etc. in the range between the creation times of the pages B and D, and the page network probability $P_{network}$ is computed for each of the assigned hypothetical values of creation time parameter $T_{C1}$, $T_{C2}$, etc to thereby determine which one of the values $T_{C0}$, $T_{C1}$, $T_{C2}$, etc. corresponds to the greatest value for the page network probability $P_{network}$.

As mentioned above, although the method 500 is being described above, for convenience, with the assumption that the page network 200 has only one target page C with an unknown creation time $T_C$, the method 500 is not limited to this assumption. The page network 200 can have more than one target page with an unknown creation time and the method 500 can be used to simultaneously determine the unknown creation times for a plurality of web pages of the page network 200.

When the page network 200 has a plurality of target pages, the page network probability $P_{network}$ varies as a function of each of the corresponding creation time parameters T of the plurality of target pages. Thus, when the page network 200 has a plurality of target pages, the respective creation times of the plurality of target pages are determined by identifying a global maximum of the page network probability $P_{network}$ in an n-dimensional space, n being the number of target pages in the page network 200. In this n-dimensional space, the creation time for each target page corresponds to the value of the corresponding creation time parameter T at the global maximum of the page network probability $P_{network}$. Thus, in some implementations, when the page network 200 has a plurality of target pages, the respective creation time parameters T of the plurality of target pages are varied simultaneously and the respective creation times of the plurality of target pages are determined simultaneously.

In some non-limiting implementations of the method 500, a gradient descent algorithm is used to determine the value(s) of the creation time parameter T for one or more target pages that maximizes the network probability $P_{network}$. In the illustrated implementation, the creation time parameter T for each of target pages is varied by increments of +1 day or −1 day to find the value that maximizes the page network probability $P_{network}$. It should be understood however that the increments of creation time parameter T could be different from 1 day, and would in general depend on the desired accuracy and precision for determining the unknown creation time, and/or on the range of the known creation times. For example, if the known creation times are distributed over a 5-year period, the increments used for the creation time parameters T may be larger than if the known creation times are distributed over a 5-month period. The method 500 however is not to be limited to any particular method for finding the maximum of the page network probability $P_{network}$ as a function of the creation time parameter T of the target page(s) in order to determine the actual creation time for the target page(s).

It is also contemplated that all of the pages in the page network 200 could be target pages for which the creation times are unknown (or known only approximately), and that the method 500 could be implemented to determine the creation times of all of the target pages. However, if none of the web pages in the page network 200 have a known creation time, the creation times determined for all of the web pages could be offset by a given time period compared to their respective actual creation times. Having at least one anchor page with a known creation time which is treated as fixed during step 560 for maximizing the page network probability $P_{network}$ serves to anchor the determination of unknown creation times to a time period defined by the known creation time and thereby provided more accurate values for the unknown creation times.

Stopping Criteria

In some implementations of the gradient descent algorithm, a stopping criterion is defined to limit the number of steps by which the creation time parameters T are varied for maximizing of the page network probability, $P_{network}$.

In some implementations, each host is associated with a corresponding stopping criterion. Thus, a stopping criterion is defined for each host in some implementations of the gradient descent algorithm.

Decay parameter ($\tau$)

As mentioned above, probability $P_{CB}$ of the link from page C to page B is proportional to $e^{-(TB-TC)/\tau}$ where $\tau$ is a decay parameter of the destination page. The page network probability $P_{network}$ therefore also depends on the decay parameter, $\tau$, for each page in the page network. The decay parameter, $\tau$, is generally indicative of how quickly pages becomes obsolescent, or of the rate at which popularity of a page decays. The greater the value of the decay parameter for a page, the faster the page becomes obsolescent. In general, each page has its own characteristic decay parameter $\tau$. In the illustrated implementation, the decay parameter $\tau$ is a characteristic of the host, and therefore all the pages hosted by a particular host are associated with by the same decay parameter $\tau$. In the exemplary scenario of FIG. 3, since all the pages A to F of the page network 200 belong to the same host, the decay parameter is the same for all the pages. It is further contemplated that the decay parameter could be characteristic of a group of hosts, or of a particular page network, such as the page network 200.

In some implementations the decay parameter $\tau$ is predefined. For example, the decay parameter could be a predefined value that is predefined for all pages of a particular host.

In some implementations, the decay parameter $\tau$ is determined during execution of the method 500. In some implementations, the decay parameter $\tau$ is determined using pages of the page network 200 with known creation times. In the illustrated implementation of the method 500, the links between pages in the page network 200 having known creation times is grouped in the following way: for a given integer i, the number $x_i$ of links between pages having an age difference between (i−1) and i days is tabulated and plotted on a logarithmic plot of $x_i$ as a function of i. The decay parameter $\tau$ is then obtained from the slope of the line on the logarithmic plot of (i, log $x_i$). It is however contemplated that the decay parameter $\tau$ could be determined using other methods.

Quality Parameter

In some implementations, each of the pages A, B, C, D, E and F has a respective quality parameter $Q_A$, $Q_B$, $Q_C$, $Q_D$, $Q_E$ and $Q_F$.

In some non-limiting implementations, the link probability P for each link L is also based on the quality parameter Q of the destination page of the link L, in addition to the age difference a between the source page and the destination page.

The quality parameter Q of a page is indicative of its usefulness or popularity. A page that includes information that is useful, or of interest, to a large number of users has a higher quality parameter than a page that includes information that is less useful, or of interest to a smaller number of users. Thus, generally, a page that has a higher quality parameter has a greater number of incoming links than a page that has a lower quality parameter. In some non-limiting implementations, the value of the quality parameter for a page is defined based on the number of incoming links to the page.

It is however contemplated that, in addition to using the number of incoming links or instead of using the number of incoming links, the quality parameter Q could also be based on other criteria such as, but not limited to, the number of views to a page.

For example, a page having information related to the rock group Beatles would have a higher quality parameter and a greater number of incoming links than a page having information related to Hungarian provincial elections.

The quality parameter for a page could also depend on other factors such as the popularity of the host where the page is hosted. In some implementations, the quality parameter Q is predefined based on a quality parameter $Q_{host}$ of a corresponding host hosting the page. In some implementations, all the pages hosted by a particular host could have the same quality parameter Q.

In some non-limiting implementations, the link probability P for the occurrence of a link from a source page to a destination page is a function of the quality factor Q of the destination page.

In some non-limiting implementations, the link probability P for the occurrence of a link from a source page to a destination page is proportional to the quality factor Q of the destination page in addition to being a function of the age difference a between the source and destination pages.

In some further implementations, the link probability P for the occurrence of a link from a source page to a destination page is generally proportional to the quality parameter Q and inversely exponentially proportional to the age difference a. Thus, as mentioned above, in some implementations, $P \propto Q \cdot e^{-a/\tau}$.

In some implementations, the quality parameter Q is predefined and known for one or more pages of the page network 200.

In some implementations, the quality parameter Q for one or more pages of the page network 200 is unknown and thus determined in the execution of the method 500. Since the link probability P of each link is a function of the quality parameter Q of the destination page for the link, the page network probability $P_{network}$ is a function of the quality parameter Q of each one of the pages in the page network 200, $P_{network} = f(Q_A, Q_B, Q_C, \ldots)$ This relationship between the link probability P and the quality parameter Q can also be used to determine the quality parameter for one or more pages of the page network 200. In general, the actual quality parameter for a page is one that maximizes the page network probability $P_{network}$.

In some implementations, the quality parameter Q associated with each page in the page network 200 is unknown, and all of the unknown quality parameters Q are determined during the execution of the method 500. In some non-limiting implementations, a hypothetical initial value is assigned to the quality parameter Q for each page of the page network 200. For example, an initial value of the quality parameter Q for a page can be assigned initially based on the number of incoming links to that page. It is contemplated that the initial value for the quality parameter Q can also be assigned based on criteria other than the number of incoming links. The page network probability $P_{network}$ is then determined based on the initial values assumed for the quality parameter Q for each of the pages of the page network 200. The value of the quality parameter(s) Q of one or more pages can then be adjusted to maximize the page network probability $P_{network}$. The actual value of the quality parameter Q for a page is the corresponding value that maximizes the page network probability $P_{network}$. As discussed above for determining the creation time of a plurality of target pages, if there are a plurality of pages with unknown quality parameters Q, the unknown quality parameters Q are varied simultaneously to simultaneously determine the actual values thereof.

As discussed above for the determination of the creation times, the value of the quality parameter based on the maxima of the page network probability $P_{network}$ function can be determined using a method such as the gradient descent method. The method 500 is however not limited to any one particular method for finding the value of the quality parameter Q for one or more pages that maximizes the age network probability $P_{network}$.

In a non-limiting implementation, the creation time parameters for all the pages having unknown creation times (target pages) and the quality parameter Q for all the pages having unknown quality parameters Q are determined simultaneously by varying their respective values to maximize the page network probability $P_{network}$. It is however contemplated that the quality parameter Q for some of the pages could be determined separately from the creation times of some of the pages.

Additional Parameters

It should be understood that the page network probability $P_{network}$ could depend on other parameters in addition to the creation time T, decay parameter τ, and the quality parameter Q for each page of the page network 200. It is contemplated that some of these additional parameters may have known values, or values that can be determined outside of the method 500. It is also contemplated that the values of some of the additional parameters could be determined during execution of the method 500. For example, in the particular implementation (discussed above) where the link probability for a link is given by:

$$P \propto Qe^{-\frac{a}{\tau}}\left(1 - \frac{1}{2}e^{-ca}\right) \text{ for } a \geq 0; \text{ and}$$

$$P \propto Qe^{-\frac{a}{\tau}}\frac{e^{ca}}{2} \text{ for } a < 0$$

The value of the sigmoid function parameter c can be determined in the method 500. An initial value could be assigned to the sigmoid function c at step 540 and then at step 560, the value of c could be varied to maximize the page network probability $P_{network}$, the optimal value of the sigmoid function c being the value that maximizes the page network probability $P_{network}$.

In some implementations, the value of the sigmoid function parameter c is determined simultaneously along with the unknown creation times of the target pages in the page network 200 and/or with the unknown quality parameters Q of pages in the page network 200. In some implementations, the value of the sigmoid function parameter c is determined separately from the unknown creation times of the target pages in the page network 200 and/or the unknown quality parameters Q of pages in the page network 200.

Representation of Numbers

In some implementations, where the link probability P is an exponential function of one or more parameters, for example the age difference a, or the sigmoid function parameter, c, the computation of the page network probability $P_{network}$ involves the computation of several sums of exponentials. The accurate computation of sums of exponentials sometimes requires exponentials to be represented as quadruple precision numbers. As is known, processors which can accommodate large numbers of high precision numbers are physically larger, more expensive and consume more power than processors designed for lower precision numbers.

In some implementations of the method 500, each number R is represented as by two numbers X and Y such that $$R=Xe^Y$$

By representing a number R as $Xe^Y$, the computation of sums of exponents can be performed accurately without storing each number in the processor as a quadruple precision number, and thereby allowing for a reduction in the physical size, cost and energy consumption in the processor of the search engine server 120 implementing the method 500.

Method for Assigning Initial Values for Creation Time Parameter

The accuracy of the creation times determined using the method 500, and the amount of time and resources (number of operations, steps or iterations for varying the creation time parameters T of one or more pages) taken to determine the actual creation times depends on the initial values assigned to the creation time parameters for the pages in the page network 200. A method 600 for assigning initial values to the creation time parameters T of all the web pages in the page network 200 will now be described. The method 600 is executed as part of step 540 in some implementations of the method 500 described above. The method 600 is executed by the server, such as the search engine server 120, executing the method 500.

At step 610, for each page associated with a known creation time, the corresponding known creation time is assigned as the initial value of the creation time parameter T of the page. As mentioned above, some of the web pages in the page network 200 may have a known creation time, where the creation time is known before commencing the method 500 for determining the unknown creation times of one or more target pages, for example, from a previous analysis of a different page network including the web page in question.

At step 620, one or more pages of the page network 200 are analyzed to extract temporal expressions. In some implementations, all of the pages of the page network are analyzed. In some implementations, only a subset of the pages of the page network 200 is analyzed. For example, in some implementations, the web pages for which the creation time is already known may not be analyzed for extracting a creation time therefrom.

As mentioned above, textual analysis of a web page includes analyzing the URL and the source code (for example, the HTML document associated with the web page. Textual analysis of the web page is performed using techniques such as machine learning, pattern analysis, HTML segmentation, and other techniques for extracting temporal expressions from different locations of the page (such as the URL, the HTML metadata, and the displayed content of the web page).

At step 630, for each analyzed page having a temporal expression in the URL and/or source code document, an extracted value of creation time is obtained from the extracted temporal expression.

In some implementations, the URL and HTML document associated with the web page include a plurality of temporal expressions. Therefore, in some implementations, by analysis of the web page, a plurality of possible values for creation time are extracted from the URL and HTML document associated with the web page. The plurality of possible creation time values are analyzed to discard obviously corrupted times, such as those referring to dates in the future or to dates far in the past. The extracted value of creation time associated with the page is then selected to be one of the remaining possible values of creation time, or a function of one or more of the remaining possible values of creation time. For example, the assigned initial value could be an earliest one of the remaining extracted values.

In some implementations, the reliability of an extracted value of creation time is considered. If an extracted value is considered to be reliable, the creation time for that web page is considered to be known, and the initial value assigned to the creation time parameter T for that page is then kept fixed for the analysis of step 560 of the method 500 above. If an extracted value is not considered to be reliable, the creation time for that web page is considered to be unknown, the web page is considered to be a target page for the purposes of the method 500 described above, and as such, the initial value assigned to the creation time parameter T for that page is varied for the analysis of step 560 as discussed above.

In some implementations, the reliability of an extracted value is defined based on the location from which the temporal expression yielding the extracted value was extracted.

In some implementations, an extracted value of creation time extracted from the URL is considered to be a reliable indicator of the actual creation time of the web page, and an extracted value of creation time obtained from the URL is considered to be the actual creation time of the web page. Thus, the creation time of a web page associated with an extracted value of creation time extracted form the URL is considered to be known.

In some implementations, an extracted value of creation time extracted from the URL is considered to be a more reliable indicator of the actual creation time of the web page than an extracted value of creation time extracted from the HTML document.

In some implementations, an extracted value of creation time extracted by analysis of the HTML document is considered to be reliable based on where in the HTML document the temporal expression yielding the extracted value was extracted. As is known, an HTML document is comprised of different portions. The HTML document includes a body which relates to the main content presented to the user (on the user output device) when the web page is accessed by the user. The HTML document also includes metadata including information related to the HTML document such as a document description, author, title, keywords, last modified time and the like. The metadata is machine parseable for use by the browser application, search engine application, and the like, but is not displayed to a user (on the user output device) when the web page is accessed by the user. The metadata in the HTML document could be placed above the HTML body, below the HTML body, or both. In some implementations, an extracted value of creation time is considered to be the actual creation time for the web page based on the location from which the value was extracted. For example, a web page associated with an extracted value of creation time extracted from a date appearing in the metadata could be considered to have a known creation time while a web page associated with an extracted value of creation time extracted from a date appearing in the HTML body could be considered to have an unknown creation time.

In some implementations, an extracted value of creation time extracted from a portion of the HTML document above the HTML body is considered to be a reliable indicator of the actual creation time of the web page, and therefore considered to be the actual creation time of the web page. Thus, the creation time of a web page associated with an extracted value of creation time extracted from the portion of the HTML document above the HTML body is considered to be known.

In some implementations, an extracted value of creation time extracted from the HTML document is considered to be a reliable indicator of the actual creation time of the web page if extracted from the title. Thus, the creation time of a web page associated with an extracted value of creation time extracted from the title in the HTML document is considered to be known.

In some implementations, different locations of the web page are ranked as shown below for the reliability of a creation time extracted therefrom:

(1) URL of the page;
(2) Title of the page in the HTML document;
(3) portion of the HTML document above the HTML body and other than the title;
(4) portion of the HTML document below the HTML body and other than the title
(5) HTML body in the HTML document.

In the above, the term "HTML body" refers to the portion of the HTML document which relates to the main content of the web page, i.e. the content that is presented to the user on the output device when the user accesses the web page. For example, the HTML body refers to the portion of the HTML document between the tags "<body>" and "</body>".

The title refers to the title for the web page which is presented on the web page, typically at the top of the browser window, when the web page is accessed by the user. For example, the title is defined by the text between the tags "<title>" and "</title>".

It should be understood that although the discussion herein refers to the source code for the web page as an "HTML document", the scope of the technology is not to be limited to HTML source code.

In the particular implementation above, a creation time extracted from any one of the locations (1), (2) and (3) is considered to be the actual creation time, and accordingly, a web page is considered to have a known creation time if the creation time can be extracted from the URL, the title, or any other portion of the HTML document above the HTML body.

In some implementations, a page is analyzed in order of the ranking (1) to (5) above to find a temporal expression. Thus, the URL of the page is first searched for a temporal expression, then the title in the HTML document, and so on. In some implementations, the analysis of the page in the order of the ranking (1) to (5) above stops when a temporal expression is found.

It is contemplated that the ranking of locations for reliability of creation times extracted therefrom could be different from that above, or that other locations of the web page could be considered for extraction of creation times.

Thus, to summarize, at step 630, as a result of textual analysis of the web pages (URL and HTML document thereof) as described above, possible values of creation times (extracted values) are extracted for some of the pages in the page network 200. In some implementations, some of the extracted values are considered to be reliable and thus known creation times, while the remaining extracted values are considered to be unknown creation times that need to be verified for the purposes of the method 500.

At step 640, for each page associated with an extracted value of creation time, the corresponding extracted value is assigned as the initial value for the creation time parameter T of the corresponding web page.

In the illustrated implementation, at step 640, for any page associated with an extracted value of creation time, the extracted value is assigned as the initial value of the corresponding creation time parameter T for the corresponding page, whether or not the extracted value is considered to be reliable. It is however contemplated that, at step 540, an extracted value of creation time that is not considered to be reliable could not be assigned as the initial value of the creation time parameter T for the corresponding page (target page).

Thus, in general, at the end of step 630, the page network 200 could have one or more pages with known and/or extracted values of creation time. Web pages having a known and/or extracted value of creation time are referred to hereinafter as dated pages for convenience. A web page for which no creation time information could be extracted by textual analysis of the web page, and for which the creation time is not otherwise known is referred to hereinafter as an undated page for convenience.

If all of the web pages in the page network 200 are dated pages after execution of step 630, the method 600 ends after execution of step 640.

If the page network 200 has any undated pages remaining after the execution of step 630, and if any of the remaining undated pages have links to/from the dated pages, step 650 of the method 600 is executed to estimate creation times for the undated web pages.

Creation Time Propagation

At step 650, a creation time is estimated for any undated page in the page network 200 that is linked to a dated page by a link chain including one or more links.

If an undated page has an outgoing link from or an incoming link to a dated page, the undated page is linked to the dated page by a single link chain and the undated page is considered to be in a first degree of separation from the dated page. All undated pages having a link to/from another undated page having a link to/from a dated page are linked to the dated page by a double link chain and considered to be in a second degree of separation from the dated page. As will be understood, an undated web page could be linked to a dated page by a link chain comprising any number of links, the number of links in the link chain defining the degree of separation between the undated page and the dated page.

At step 650, creation time propagation is used to estimate the creation time of an undated web page by propagating the creation time of a dated page via the link chain connecting the dated page to the undated page. A creation time estimated by propagating known and/or extracted values of creation times of one or more dated pages is referred to herein as a propagated value of creation time.

Propagated values of creation time can be obtained by propagation of known and/or extracted values in a single iteration, or by multiple iterations thereof as will be discussed below.

In the first iteration of creation time propagation, creation times are estimated for undated web pages in a first degree of separation from a dated page. For each undated web page in a first degree of separation from at least one dated web page, the propagated value of creation time is a function of the respective known and/or extracted values of creation times of the one or more dated web pages linked thereto by an incoming/outgoing link.

In some implementations, the propagated value of creation time for an undated page is the middle between the latest one of the creation times of the dated web pages having an incoming link from the undated web page and the earliest one of the creation times of the dated web pages having an outgoing link to the undated page.

In some implementations, the propagated value of creation time for a given undated web page is obtained by an average propagation method wherein the propagated value is an average of the known/and or extracted creation times of all of the dated web pages having an incoming link from or an outgoing link to the given undated page.

In some implementations, the propagated value of creation time for a given undated web page is obtained by an average in-propagation method wherein the propagated value is an average of the known and/or extracted creation times of the dated web pages from which the undated web page has an incoming link.

In some implementations, the propagated value of creation time for a given undated web page is obtained by an average out-propagation method wherein the propagated value is an average of the known and/or extracted creation times of the dated web pages to which there is an outgoing link from the undated page.

In some implementations, the propagated value of creation time for a given undated web page is obtained by a median propagation method wherein the propagated value is a median of the known/and or extracted creation times of all of the dated web pages having an incoming link from or an outgoing link to the dated page.

In some implementations, the propagated value of creation time for a given undated web page is obtained by a median in-propagation method wherein the propagated value is a median of the known and/or extracted values of creation times of the dated web pages from which the undated web page has an incoming link.

In some implementations, the propagated value of creation time for a given undated web page is obtained by a median out-propagation method wherein the propagated value is a median of the known and/or extracted values of creation times of the dated web pages to which there is an outgoing link from the undated page.

In some implementations, the propagated value of creation time for a given undated web page is obtained based on a q-quantile propagation method. The quantile q is assumed to be some value between 0 and 1 inclusively, $0 \leq q \leq 1$, and the propagated value of the creation time is selected to be the middle between the q-quantile of the known and/or extracted values of creation times of all the dated web pages from which the undated page has an incoming link, and the (1−q) quantile of the known and/or extracted values of creation times of all the dated web pages to which there is an outgoing link from the undated page.

A propagated value of creation time, obtained as described above, for an undated page in a first degree of separation from a dated page, by propagation in a single iteration of known and/or extracted values of creation times of dated web pages is referred to hereinafter as a first order propagated value. For a given undated page having a link to/from one or more undated pages having a first order propagated value of creation time (i.e. in a second degree of separation from a dated page), the propagated value of creation time is a function of the respective first order propagated values of creation times of those undated web pages having a link from/to the given undated web page. For example, in some implementations, the propagated value of creation time for a given undated web page is an average of the first order propagated values of all of the undated web pages having a first order propagated value of creation time, and having an incoming link from or an outgoing link to the given undated page.

A propagated value of creation time for an undated web page obtained by propagation of first order propagated values of creation times is referred to hereinafter as a second order propagated value. Thus, all undated web pages in a second degree of separation from at least one dated page are associated with a second order propagated value of creation time.

A second order propagated value of creation time could be obtained from the one or more first order propagated values using any of the methods mentioned above, such as in-propagation, out-propagation, average propagation, median propagation, q-quintile propagation, and the like for obtaining the first order propagated value.

In general, after the first iteration of propagation, at each subsequent iteration of propagation, a propagated value of creation time is obtained by taking a function of one or more of the propagated values of creation times obtained at the previous iteration of propagation.

The propagation of creation times ends either when there are no more undated web pages, or when there are no other undated web pages that are linked to a dated web page by a chain link. At the end of creation time propagation, all the undated web pages connected to a dated web page by any degree of separation have a propagated value of creation time.

At the end of step 650, each undated web page at any degree of separation from a dated web page has a corresponding propagated value of creation time.

At step 660, for each undated web page at any degree of separation from a dated web page, the corresponding propagated value of creation time associated with the undated web page is assigned as the initial value for the corresponding creation time parameter T.

As mentioned above, a propagated value of creation time cannot be obtained for some of the undated web pages as they are not linked to a dated page by a link chain.

At step 670, an initial value is assigned to the creation time parameter T for any web page which does not have a known creation time, an extracted value of creation time or a propagated value of creation time. In some implementations, the initial value of creation time assigned to an undated web page without a propagated creation time is based on other factors such as the time of the first visit to the web page, the time of the first crawl, and the like. In some implementations, for an undated page not associated with an extracted or propagated value of creation time, the creation time parameter T is assigned an initial value that is predefined for the page network 200.

Thus at the end of step 670, an initial value has been assigned to the creation time parameter T for each page in the page network 200.

It should be appreciated that the methods 500, 600 described above are not limited only to determining the creation times of web pages but can also be used to determine the creation time of other kinds of web resources such as photos, videos, music and the like, using the link structure by which the given web resource is connected to other web pages and/or web resources.

The method 500, 600 described above, by providing additional or more accurate information regarding the creation time of web pages, enables service providers such as search engines and the like to provide more relevant search results to users. Users of web resources and web services are therefore afforded a better web browsing experience with a more efficient use of their time and available network resources. The method 500, 600 described above also benefits service providers such as search engines, web crawlers and host servers by allowing for a better allocation of the available network and hardware resources.

Clause 1. A method (500) of determining a creation time of a target page, the method (500) being executable at a server (120) coupled to a communication network (110), the method (500) comprising:
 creating (520) a page network (200) comprising a plurality of pages including the target page and a plurality of links,
  each link of the plurality of links having a source page and a destination page, each of the source page and the destination page being one of the plurality of pages, each page of the plurality of pages being one of a source page and a destination page for at least one of the plurality of links,
  each page of the plurality of pages having a corresponding creation time,
  the creation time for each page being one of known and unknown,
  the creation time of the target page being unknown,
  each page of the plurality of pages being associated with a corresponding creation time parameter T indicative of the corresponding creation time of the page,
 assigning (540) an initial value to the creation time parameter T for each page of the page network,
 the initial value assigned to the creation time parameter T for any page having a known creation time being the corresponding known creation time;
 varying (560) the initial value of the creation time parameter T of the target page to maximize a page network probability $P_{network}$,
 the page network probability $P_{network}$ being based on a link probability P for each link of the plurality of links, the link probability P for each link being based at least in part on a difference between a creation time parameter T of the source page of the link and a creation time parameter T of the destination page of the link, the difference being the age difference a between the source page and the destination page; and
 determining (580) the creation time of the target page to be the value of the creation time parameter T of the target page which maximizes the page network probability $P_{network}$.

Clause 2. The method (500) of claim 1 wherein:
 the target page is a plurality of target pages;
 each target page of the plurality of target pages has a corresponding unknown creation time and a corresponding creation time parameter T associated therewith; and
 wherein:
 varying (560) the initial value of the creation time parameter T of the target page to maximize the page network probability $P_{network}$ comprises simultaneously varying the value of the creation time parameter T of all of the plurality of target pages to maximize the page network probability $P_{network}$; and
 determining the creation time of the target page comprises determining the value of the corresponding creation time parameter T of each target page of the plurality of target pages when the page network probability $P_{network}$ is maximized as a function of all of the creation time parameters T of all of the target pages of the plurality of target pages.

Clause 3. The method (500) of clause 1 or 2, wherein the plurality of pages includes at least one page other than the target page, at least one page other than the target page being an anchor page, the creation time of the anchor page being known, the method further comprising:
 keeping the value of the creation time parameter T for the anchor page fixed while varying the value of the creation time parameter T of the target page to maximize the page network probability $P_{network}$.

Clause 4. The method (500) of any one of clauses 1 to 3, wherein for a first page of the plurality of pages, assigning the initial value to the creation time parameter T of the first page comprises:
 analyzing the first page; and
 responsive to analyzing the first page, extracting a value for the creation time of the first page from one of a URL and a source code of the first page, the value extracted for the creation time of the first page being an extracted value of creation time,
 the initial value assigned to the creation time parameter T of the first page being the extracted value of creation time for the first page.

Clause 5. The method (500) of clause 4, further comprising:
 determining the extracted value of creation time of the first page to be the creation time of the first page and determining the first page not to be the target page based on a location from which the extracted value of creation time is extracted.

Clause 6. The method of clause 5, wherein the determining the extracted value of creation time of the first page to be the creation time of the first page and determining the first page not to be the target page is responsive to extracting the extracted value of the creation time from one of the following locations:
 the URL of the first page;
 a title of the first page in the source code of the first page; and
 a first portion of the source code of the first page other than the title, the first portion occurring before a portion of the source code related to the displayed content of the first page.

Clause 7. The method of any one of clauses 1 to 6, wherein for the target page of the plurality of pages, the target page having at least one of an incoming link from a corresponding source page and an outgoing link to a corresponding destination page,
 assigning the initial value to the creation time parameter T of the target page comprises:
 determining a propagated value of creation time for the target page based on the creation time parameter of the corresponding at least one of the source page of the incoming link and the destination page of the outgoing link; and
 assigning the propagated value of creation time as the initial value for the creation time parameter of the target page.

Clause 8. The method (500) of any one clauses 1 to 7 wherein, the link probability for each link is further based on a quality parameter Q for the destination page for the link.

Clause 9. The method (500) of claim 8, wherein the quality parameter Q for a first page of the plurality of pages is predefined.

Clause 10. The method (500) of claim 8, wherein the quality parameter Q for a first page the plurality of pages is unknown, the method further comprising:
  assigning an initial value to the quality parameter Q for the first page;
  varying the initial value of the quality parameter Q of the first page to maximize the page network probability $P_{network}$; and
  determining the quality parameter Q of the first page to be the value of the quality parameter Q that maximizes the page network probability $P_{network}$.

Clause 11. The method (500) of any one of clauses 1 to 10, wherein, the link probability for each link is further based on a decay parameter $\tau$ for the page network.

Clause 12. The method (500) of claim 11, further comprising:
  determining the decay parameter $\tau$ for the plurality of pages to be a value that maximizes the page network probability $P_{network}$.

Clause 13. The method (500) of any one of clauses 1 to 12, wherein the link probability P for each link of the plurality of links is proportional to $$Qe^{-\frac{a}{\tau}} \text{ for } a \geq 0$$

Q being the quality parameter for the destination page of the link,
  a being the age difference between the between the source page and the destination page given by $T_{source} - T_{dest}$,
  $T_{source}$ being the creation time parameter T of the source page,
  $T_{dest}$ being the creation time parameter T of the destination page,
  $T_{source}$ being later than $T_{dest}$,
  $\tau$ being a decay parameter.

Clause 14. The method (500) of any one of clauses 1 to 12, wherein the link probability P for each link of the plurality of links is proportional to $$Qe^{-\frac{a}{\tau}}S(a)$$

Q being the quality parameter for the destination page of the link,
  a being the age difference between the between the source page and the destination page given by $T_{source} - T_{dest}$,
  $T_{source}$ being the creation time parameter T of the source page,
  $T_{dest}$ being the creation time parameter T of the destination page,
  $T_{source}$ being later than $T_{dest}$,
  $\tau$ being a decay parameter, and
  S(a) being a sigmoid function of a.

Clause 15. The method (500) of claim 14, wherein the sigmoid function is:

$$S(a) = 1 - \frac{1}{2}e^{-ca} \text{ for } a \geq 0; \text{ and}$$

$$S(a) = \frac{e^{ca}}{2} \text{ for } a < 0,$$

c being a sigmoid function parameter.

Clause 16. The method (500) of claim 14, further comprising representing each number R by two numbers X and Y, wherein:

$$R = Xe^Y$$

Clause 17. The method (500) of claim 1, further comprising
  using a gradient descent method to determine the value of the creation time parameter T that maximizes the page network probability $P_{network}$.

Clause 18. The method (600) of claim 1, wherein assigning the initial value to the creation time parameter T of each page comprises:
  for any page having a respective known creation time, assigning (610) the respective known creation time as the initial value of the creation time parameter T of the corresponding page;
  analyzing (620) each page without a known creation time to find a temporal expression therein;
  extracting (630) a value for the creation time of a page responsive to finding a temporal expression in the corresponding page, the value extracted for the creation time of the corresponding page being an extracted value of creation time;
  for any page having a respective extracted value of creation time, assigning (640) the respective extracted value of creation time as the initial value of the creation time parameter T of the corresponding page; and
  propagating (650) the known creation times and the extracted values of creation time to obtain a propagated value of creation time for each page without any one of an extracted value of creation time and a known creation time and being linked, by a link chain including one or more links, to a page having any one of an extracted value of creation time and a known creation time;
  for any page having a respective propagated value of creation time, assigning (660) the respective propagated value of creation time as the initial value of the creation time parameter T of the corresponding page; and
  for any page without any one of a known creation time, an extracted value of creation time, and a propagated value of creation time, assigning (670) a predefined value as the initial value of the creation time parameter T of the corresponding page.

Clause 19. The method (600) of claim 18, wherein:
  each page having a known creation time and each page having an extracted value of creation time is a dated page;
  each page without any one of a known creation time and an extracted value of creation time is an undated page; and
  for a first undated page, at least one dated page having a link to or from the first undated page, the propagated value of creation time for the first undated page is obtained by an average of the respective extracted values of creation time and known creation times of each of the at least one dated pages having a link to or from the first undated page.

Clause 20. The method (600) of claim 18, wherein:
each page having a known creation time and each page having an extracted value of creation time is a dated page;
each page without any one of a known creation time and an extracted value of creation time is an undated page; and
for a first undated page, at least one dated page having a link to or from the first undated page, the propagated value of creation time is obtained by a median of the respective extracted values of creation time and known creation time of each of the at least one dated pages having a link to or from the first page.

Clause 21. The method (600) of claim 18, wherein:
each page having a known creation time and each page having an extracted value of creation time is a dated page;
each page without any one of a known creation time and an extracted value of creation time is an undated page; and
for a first undated page, at least one dated page having a link to or from the first undated page, obtaining the propagated value of creation time comprises:
defining a quantile parameter q such that 0≤q≤1; and
selecting as the propagated value of creation time for the first undated page a value in the middle of a q-quantile of the respective extracted values of creation times of the at least one dated pages having a link from the first undated page and a (1-q) quantile of respective extracted values of creation times of each of the at least one dated pages having a link to the first undated page.

Clause 22. The method (600) of claim 18, wherein:
each page having a known creation time and each page having an extracted value of creation time is a dated page;
each page without any one of a known creation time and an extracted value of creation time is an undated page; and
each undated page having a link to or from at least one dated page being a first undated page,
for each first undated page, the corresponding propagated value of creation time is a first order propagated value obtained from the extracted values of creation time and known creation times of the at least one dated pages having a link thereto or therefrom; and
each undated page not being a first undated page and having a link to or from at least one first undated page being a second undated page,
for each second undated page, the corresponding propagated value of creation time is a second order propagated value obtained from the first order propagated values of the at least one first undated pages having a link thereto or therefrom.

Clause 23. A server (120) communicatively coupled to a user electronic device (102) and at least one host (130, 132) via a communication network (110), the at least one host hosting a plurality of pages, the server (120) including a processing module being configured to:
create (520) a page network (200) comprising the plurality of pages including the target page and a plurality of links,
each link of the plurality of links having a source page and a destination page, each of the source page and the destination page being one of the plurality of pages, each page of the plurality of pages being one of a source page and a destination page for at least one of the plurality of links,
each page of the plurality of pages having a corresponding creation time,
the creation time for each page being one of known and unknown,
the creation time of the target page being unknown,
each page of the plurality of pages being associated with a corresponding creation time parameter T indicative of the corresponding creation time of the page,
assign (540) an initial value to the creation time parameter T for each page of the page network,
the initial value assigned to the creation time parameter T for any page having a known creation time being the corresponding known creation time;
vary (560) the initial value of the creation time parameter T of the target page to maximize a page network probability $P_{network}$,
the page network probability $P_{network}$ being based on a link probability P for each link of the plurality of links, the link probability P for each link being based at least in part on a difference between a creation time parameter T of the source page of the link and a creation time parameter T of the destination page of the link, the difference being the age difference a between the source page and the destination page; and
determine (580) the creation time of the target page to be the value of the creation time parameter T of the target page which maximizes the page network probability $P_{network}$.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining a creation time of a target page, the method being executable at a server coupled to a communication network, the method comprising:
creating a page network comprising a plurality of pages including the target page and a plurality of links, each link of the plurality of links having a source page and a destination page, each of the source page and the destination page being one of the plurality of pages, each page of the plurality of pages being one of a source page and a destination page for at least one of the plurality of links, the target page having at least one of an incoming link from a corresponding source page and an outgoing link to a corresponding destination page, each page of the plurality of pages having a corresponding creation time, the creation time for each page being one of known and unknown, the creation time of the target page being unknown, each page of the plurality of pages being associated with a corresponding creation time parameter T indicative of the corresponding creation time of the page, assigning an initial value to the creation time parameter T for each page of the page network, the initial value assigned to the creation time parameter T for any page having a known creation time being the corresponding known creation time, the initial value assigned to the creation time parameter T of the target page being a propagated value of creation time determined based on the creation time parameter of the corresponding at least one of the source page of the incoming link and the destination page of the outgoing link;
varying the initial value of the creation time parameter T of the target page to maximize a page network probability $P_{network}$, the page network probability $P_{network}$ being based on a link probability P for each link of the plurality of links, the link probability P for each link being based at least in part on a difference between a creation time parameter T of the source page of the link and a creation time parameter T of the destination page of the link, the difference being the age difference a between the source page and the destination page; and determining the creation time of the target page to be the value of the creation time parameter T of the target page which maximizes the page network probability $P_{network}$.

2. The method of claim 1 wherein: the target page is a first target page of a plurality of target pages;

each target page of the plurality of target pages has a corresponding unknown creation time and a corresponding creation time parameter T associated therewith; and wherein: varying the initial value of the creation time parameter T of the target page to maximize the page network probability $P_{network}$ comprises simultaneously varying the value of the creation time parameter T of all of the plurality of target pages to maximize the page network probability $P_{network}$; and determining the creation time of the target page comprises determining the value of the corresponding creation time parameter T of each target page of the plurality of target pages when the page network probability $P_{network}$ is maximized as a function of all of the creation time parameters T of all of the target pages of the plurality of target pages.

3. The method of claim 2, wherein for a first page of the plurality of pages, assigning the initial value to the creation time parameter T of the first page comprises:

analyzing the first page;

responsive to analyzing the first page, extracting a value for the creation time of the first page from one of a URL and a source code of the first page, the value extracted for the creation time of the first page being an extracted value of creation time, the initial value assigned to the creation time parameter T of the first page being the extracted value of creation time for the first page; and determining the first page to be a second target page of the plurality of target pages based on a location from which the extracted value of creation time is extracted.

4. The method of claim 1, wherein the plurality of pages includes at least one page other than the target page, at least one page other than the target page being an anchor page, the creation time of the anchor page being known, the method further comprising: keeping the value of the creation time parameter T for the anchor page fixed while varying the value of the creation time parameter T of the target page to maximize the page network probability $P_{network}$.

5. The method of claim 1, wherein for a first page of the plurality of pages, assigning the initial value to the creation time parameter T of the first page comprises: analyzing the first page; and responsive to analyzing the first page, extracting a value for the creation time of the first page from one of a URL and a source code of the first page, the value extracted for the creation time of the first page being an extracted value of creation time, the initial value assigned to the creation time parameter T of the first page being the extracted value of creation time for the first page.

6. The method of claim 5, further comprising: determining the extracted value of creation time of the first page to be the creation time of the first page and determining the first page not to be the target page based on a location from which the extracted value of creation time is extracted.

7. The method of claim 6, wherein the determining the extracted value of creation time of the first page to be the creation time of the first page and determining the first page not to be the target page is responsive to extracting the extracted value of the creation time from one of the following locations:

the URL of the first page;

a title of the first page in the source code of the first page; and a first portion of the source code of the first page other than the title, the first portion occurring before a portion of the source code related to the displayed content of the first page.

8. The method of claim 1 wherein, the link probability for each link is further based on a quality parameter Q for the destination page for the link.

9. The method of claim 8, wherein the quality parameter Q for a first page of the plurality of pages is predefined.

10. The method of claim 8, wherein the quality parameter Q for a first page the plurality of pages is unknown, the method further comprising:

assigning an initial value to the quality parameter Q for the first page;

varying the initial value of the quality parameter Q of the first page to maximize the page network probability $P_{network}$; and determining the quality parameter Q of the first page to be the value of the quality parameter Q that maximizes the page network probability $P_{network}$.

11. The method of claim 1, wherein, the link probability for each link is further based on a decay parameter τ for the page network.

12. The method of claim 11, further comprising:

determining the decay parameter τ for the plurality of pages to be a value that maximizes the page network probability $P_{network}$.

13. The method of claim 1, wherein the link probability P for each link of the plurality of links is proportional to $$Qe^{-\frac{a}{\tau}} \text{ for } a \geq 0$$

Q being the quality parameter for the destination page of the link, a being the age difference between the between the source page and the destination page given by $T_{source} - T_{dest}$, $T_{source}$ being the creation time parameter T of the source page, $T_{dest}$ being the creation time parameter T of the destination page, $T_{source}$ being later than $T_{dest}$, τ being a decay parameter.

14. The method of claim 1, wherein the link probability P for each link of the plurality of links is proportional to $$Qe^{-\frac{a}{\tau}}S(a)$$

Q being the quality parameter for the destination page of the link, a being the age difference between the between the source page and the destination page given by $T_{source} - T_{dest}$, $T_{source}$ being the creation time parameter T of the source page, $T_{dest}$ being the creation time parameter T of the destination page, $T_{source}$ being later than $T_{dest}$, τ being a decay parameter, and S(a) being a sigmoid function of a.

15. The method of claim 14, wherein the sigmoid function is:

$$S(a) = 1 - \frac{1}{2}e^{-ca} \text{ for } a \geq 0; \text{ and}$$

$$S(a) = \frac{e^{ca}}{2} \text{ for } a < 0,$$

c being a sigmoid function parameter.

16. The method of claim 14, further comprising representing each number R by two numbers X and Y, wherein:

$$R = Xe^Y$$

17. The method of claim 1, further comprising using a gradient descent method to determine the value of the creation time parameter T that maximizes the page network probability $P_{network}$.

18. The method of claim 1, wherein:
the target page is a first target page of a plurality of target pages, each target page of the plurality of target pages having a corresponding unknown creation time and a corresponding creation time parameter T associated therewith;
assigning the initial value to the creation time parameter T of each page comprises:
for any page having a respective known creation time, assigning the respective known creation time as the initial value of the creation time parameter T of the corresponding page;
analyzing each page without a known creation time to find a temporal expression therein;
extracting a value for the creation time of a page responsive to finding a temporal expression in the corresponding page, the value extracted for the creation time of the corresponding page being an extracted value of creation time;
for any page having a respective extracted value of creation time, assigning the respective extracted value of creation time as the initial value of the creation time parameter T of the corresponding page; and
propagating the known creation times and the extracted values of creation time to obtain a propagated value of creation time for each page without any one of an extracted value of creation time and a known creation time and being linked, by a link chain including one or more links, to a page having any one of an extracted value of creation time and a known creation time;
for any page having a respective propagated value of creation time, assigning the respective propagated value of creation time as the initial value of the creation time parameter T of the corresponding page, the first target page being a page having a respective propagated value of creation time; and
for any page without any one of a known creation time, an extracted value of creation time, and a propagated value of creation time, assigning a predefined value as the initial value of the creation time parameter T of the corresponding page, the plurality of target pages including any page without any one of a known creation time, an extracted value of creation time, and a propagated value of creation time;
varying the initial value of the creation time parameter T of the target page to maximize the page network probability $P_{network}$ comprises simultaneously varying the value of the creation time parameter T of all of the plurality of target pages to maximize the page network probability $P_{network}$; and
determining the creation time of the target page comprises determining the value of the corresponding creation time parameter T of each target page of the plurality of target pages when the page network probability $P_{network}$ is maximized as a function of all of the creation time parameters T of all of the target pages of the plurality of target pages.

19. The method of claim 18, wherein: each page having a known creation time and each page having an extracted value of creation time is a dated page;
each page without any one of a known creation time and an extracted value of creation time is an undated page; and
for a first undated page, at least one dated page having a link to or from the first undated page, the propagated value of creation time for the first undated page is obtained by an average of the respective extracted values of creation time and known creation times of each of the at least one dated pages having a link to or from the first undated page.

20. The method of claim 18, wherein: each page having a known creation time and each page having an extracted value of creation time is a dated page;
each page without any one of a known creation time and an extracted value of creation time is an undated page; and
for a first undated page, at least one dated page having a link to or from the first undated page,
the propagated value of creation time is obtained by a median of the respective extracted values of creation time and known creation time of each of the at least one dated pages having a link to or from the first page.

21. The method of claim 18, wherein:
each page having a known creation time and each page having an extracted value of creation time is a dated page;
each page without any one of a known creation time and an extracted value of creation time is an undated page; and
each undated page having a link to or from at least one dated page being a first undated page, for each first undated page, the corresponding propagated value of creation time is a first order propagated value obtained from the extracted values of creation time and known creation times of the at least one dated pages having a link thereto or therefrom; and
each undated page not being a first undated page and having a link to or from at least one first undated page being a second undated page, for each second undated page, the corresponding propagated value of creation time is a second order propagated value obtained from the first order propagated values of the at least one first undated pages having a link thereto or therefrom.

22. The method of claim 18 further comprising: determining a page having a respective extracted value of creation time to be one of the plurality of target pages based on a location from which the extracted value of creation time is extracted.

23. The method of claim 18, wherein: each page having a known creation time and each page having an extracted value of creation time is a dated page;
each page without any one of a known creation time and an extracted value of creation time is an undated page; and for a first undated page, at least one dated page having a link to or from the first undated page, obtaining the propagated value of creation time comprises:

defining a quantile parameter q such that 0≤q≤1; and selecting as the propagated value of creation time for the first undated page a value in the middle of a q-quantile of the respective extracted values of creation times of the at least one dated pages having a link from the first undated page and a (1−q) quantile of respective extracted values of creation times of each of the at least one dated pages having a link to the first undated page.

24. A server communicatively coupled to a user electronic device and at least one host via a communication network, the at least one host hosting a plurality of pages, the server including a processor communicatively coupled to a memory storing computer readable commands, which when executed, cause the server to:

create a page network comprising the plurality of pages including the target page and a plurality of links, each link of the plurality of links having a source page and a destination page, each of the source page and the destination page being one of the plurality of pages, each page of the plurality of pages being one of a source page and a destination page for at least one of the plurality of links, the target page having at least one of an incoming link from a corresponding source page and an outgoing link to a corresponding destination page, each page of the plurality of pages having a corresponding creation time, the creation time for each page being one of known and unknown, the creation time of the target page being unknown, each page of the plurality of pages being associated with a corresponding creation time parameter T indicative of the corresponding creation time of the page, assign an initial value to the creation time parameter T for each page of the page network, the initial value assigned to the creation time parameter T for any page having a known creation time being the corresponding known creation time, the initial value assigned to the creation time parameter T of the target page being a propagated value of creation time determined based on the creation time parameter of the corresponding at least one of the source page of the incoming link and the destination page of the outgoing link;

vary the initial value of the creation time parameter T of the target page to maximize a page network probability $P_{network}$, the page network probability $P_{network}$ being based on a link probability P for each link of the plurality of links, the link probability P for each link being based at least in part on a difference between a creation time parameter T of the source page of the link and a creation time parameter T of the destination page of the link, the difference being the age difference a between the source page and the destination page; and determine the creation time of the target page to be the value of the creation time parameter T of the target page which maximizes the page network probability $P_{network}$.

* * * * *